(12) United States Patent
Niwano et al.

(10) Patent No.: US 8,194,304 B2
(45) Date of Patent: Jun. 5, 2012

(54) DISPLAY DEVICE AND ELECTRIC APPARATUS USING THE SAME

(75) Inventors: Hiroko Niwano, Tokyo (JP); Akio Miyata, Nara (JP); Tomoko Teranishi, Kyoto (JP); Shinichi Nakano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 899 days.

(21) Appl. No.: 11/912,189

(22) PCT Filed: Jun. 5, 2006

(86) PCT No.: PCT/JP2006/311238
§ 371 (c)(1),
(2), (4) Date: Oct. 22, 2007

(87) PCT Pub. No.: WO2006/129846
PCT Pub. Date: Dec. 7, 2006

(65) Prior Publication Data
US 2009/0059348 A1    Mar. 5, 2009

(30) Foreign Application Priority Data
Jun. 3, 2005 (JP) .................................. 2005-164791

(51) Int. Cl.
*G02B 26/00* (2006.01)
(52) U.S. Cl. ........................................................ 359/296
(58) Field of Classification Search .......... 359/291–296, 359/226.3, 268, 245, 247, 250, 252, 253, 359/254, 259; 345/107, 105, 48–49, 84; 430/32, 34, 38; 204/600; 348/817
See application file for complete search history.

(56) References Cited

U.S. PATENT DOCUMENTS

| | | | | |
|---|---|---|---|---|
| 4,687,596 A | * | 8/1987 | Borduz et al. | 252/510 |
| 4,760,389 A | | 7/1988 | Aoki et al. | |
| 5,717,283 A | * | 2/1998 | Biegelsen et al. | 313/483 |
| 5,731,792 A | * | 3/1998 | Sheridon | 345/84 |
| 6,545,815 B2 | * | 4/2003 | Kroupenkine et al. | 359/665 |

(Continued)

FOREIGN PATENT DOCUMENTS

AT       85438        2/1993

(Continued)

OTHER PUBLICATIONS

International Search Report for PCT/JP2006/311238 mailed Aug. 8, 2006.
U.S. Appl. No. 11/912,331, filed Oct. 23, 2007, Katoh et al.
International Search Report mailed Jun. 13, 2006.

*Primary Examiner* — Scott J Sugarman
*Assistant Examiner* — Vipin Patel
(74) *Attorney, Agent, or Firm* — Nixon & Vanderhye P.C.

(57) ABSTRACT

In a display device including: an upper space (display space) 13 provided on a display surface side; and a colored liquid 21 that is sealed inside the upper space 13 so as to be operable and is colored in a predetermined color, which is structured so as to be able to change a display color on the display surface side according to application of an electric field to the colored liquid 21, the colored liquid 21 contains a conductive liquid as a dispersion medium and a pigment of a self-dispersing type as a coloring agent. Thereby, the display device that can improve display quality and have high durability that enables to maintain an excellent displaying function over a long period of time, and the electric apparatus using the display device can be provided.

21 Claims, 6 Drawing Sheets

U.S. PATENT DOCUMENTS

| | | | |
|---|---|---|---|
| 6,577,433 B1 * | 6/2003 | Lin et al. | 359/296 |
| 6,700,556 B2 * | 3/2004 | Richley et al. | 345/84 |
| 6,767,594 B1 * | 7/2004 | Miroshin et al. | 428/1.31 |
| 7,189,014 B2 * | 3/2007 | Katsuragi et al. | 396/505 |
| 7,438,832 B2 * | 10/2008 | Majumdar et al. | 252/500 |
| 2002/0011978 A1 | 1/2002 | Yamazaki et al. | |
| 2003/0001800 A1 | 1/2003 | Nakajima et al. | |
| 2003/0165743 A1 * | 9/2003 | Horikiri et al. | 429/300 |
| 2004/0057143 A1 | 3/2004 | Steinfield et al. | |
| 2005/0030610 A1 * | 2/2005 | Soyama et al. | 359/296 |
| 2005/0231840 A1 | 10/2005 | Steinfield et al. | |
| 2005/0275616 A1 | 12/2005 | Park et al. | |
| 2006/0152474 A1 | 7/2006 | Saito et al. | |

FOREIGN PATENT DOCUMENTS

| | | |
|---|---|---|
| DE | 36 87 701 | 7/1993 |
| EP | 0 224 869 | 6/1987 |
| JP | 62-125329 | 6/1987 |
| JP | 4-174819 | 6/1992 |
| JP | 5-241512 | 9/1993 |
| JP | 11-119703 | 4/1999 |
| JP | 2002-62856 | 2/2002 |
| JP | 2002-175026 | 6/2002 |
| JP | 2004-271717 | 9/2004 |

* cited by examiner

DISPLAY DEVICE AND ELECTRIC APPARATUS USING THE SAME

This application is the U.S. national phase of International Application No. PCT/JP2006/311238 filed 5 Jun. 2006 which designated the U.S. and claims priority to Japanese Application No. 2005-164791 filed 3 Jun. 2005, the entire contents of each of which are hereby incorporated by reference.

TECHNICAL FIELD

The present invention relates to a display device that changes a display color on a display surface side by applying an electric field to a colored liquid so as to display information such as images and characters, and an electric apparatus using the display device.

BACKGROUND ART

Conventionally, display devices that achieves display by utilizing a moving phenomenon of a transparent or colored liquid have been suggested. For example, display devices of electric field induction types that utilize an external electric field to move a liquid, thereby displaying information, include those of an electroosmosis system and of an electrowetting system.

In the display devices of the electroosmosis system, a liquid impregnation rate of a surface of a porous body is controlled so as to scatter external light, whereby a light reflectance and a light transmittance thereof with respect to the external light are controlled. Also, these display devices of the electroosmosis system have a configuration in which the porous body and the transparent liquid that have an equal refractive index are prepared in advance so as to achieve transparency by filling the liquid in through holes (small holes) in the porous body and cause light to be scattered by allowing the liquid to flow out from the through holes.

In the display devices of the electrowetting system, an electric field is applied to a liquid inside small holes so as to vary an interfacial tension of the liquid, thus causing this liquid to move by an electrocapillary phenomenon (an electrowetting phenomenon). More specifically, when a switch between a pair of electrodes provided on an inner surface of a small hole is closed so as to apply an electric field to the liquid, a wettability of the liquid with respect to the inner surface of the small hole varies. Accordingly, a contact angle of the liquid with respect to the inner surface of the small hole decreases, so that the liquid moves inside the small hole. On the other hand, when the switch is opened to stop the application of the electric field to the liquid, the wettability of the liquid with respect to the inner surface of the small hole varies, thus increasing the contact angle sharply, so that the liquid flows out from the small hole.

In order to display moving images in the display devices described above, the liquid has to be moved inside the small hole at a high speed and at a low voltage. When the electroosmosis system and the electrowetting system are compared in this respect, the electrowetting system is more suitable for displaying moving images because it can move the liquid at a higher speed.

Further, using the conventional display devices, image displays utilizing the electrowetting phenomenon are provided as described in Patent Document 1 identified below, for example. This display device of the first conventional example is provided with three transparent sheets that are arranged apart from and in parallel with one another, and the transparent sheet positioned in the middle is provided with a plurality of storage cases that are filled with a polar liquid. And, in this display device of the first conventional example, an electric field is applied to the plurality of the storage cases selectively so as to transfer the polar liquid from the corresponding storage cases toward an inside of a space on the display surface side, thereby displaying colored images.

Moreover, other examples of the conventional display device utilizing the electrowetting phenomenon include an image display described in the below-identified Patent Document 2. In this display device of the second conventional example, for example, in an existing transmission-type liquid crystal display, a filter containing a colored liquid is disposed instead of a polarizing plate and a color filter so as to increase a brightness. Moreover, in this display device of the second conventional example, by arranging a plurality of filters in a layered structure, sub-pixels arranged in the same plane can be omitted, and a resolution can be increased, so that the electrowetting phenomenon is utilized as a method for moving the colored liquid in each filter.

Patent document 1: JP 11 (1999)-119703 A
Patent document 2: JP 2004-110041 A

DISCLOSURE OF INVENTION

Problem to be Solved by the Invention

However, no sufficient review with regard to the colored liquid has been carried out in the above-described conventional display device.

More specifically, in the above-described first conventional example, "a polar liquid that is colored such as water, alcohol, acetone, formamide, ethylene glycol, and mixtures of them with other appropriate liquid" is disclosed as the polar liquid of the display device. Moreover, in the conventional example, the use of "a liquid of a (nonconductive) derivative that is colored such as a silicone oil, a mineral oil, a transformer oil and a castor oil" in the display device was suggested, but a specific coloring agent is not shown.

Moreover, the second conventional example only shows the use of "the colored liquid may be a liquid pigment, a liquid dye or other appropriate colored liquid such as an ink and a toner" in the display device.

As described above, in the conventional display device, the colored liquid to be moved by the electrowetting phenomenon has not been reviewed sufficiently. In particular, almost no review has been carried out with regard to the coloring agent of the conventional display device. Thus, the conventional display device has a problem in that it cannot display (reproduce) display colors with a high brightness and can hardly improve display quality on the display surface. Moreover, in the conventional display device, migration of the coloring agent may occur, so that driving characteristics of the colored liquid may be unstable, and degradation of durability of the colored liquid, which results in degradation of durability of the display device, may occur.

In the light of the problems described above, the present invention aims to provide the display device with increased durability that can improve display quality and can maintain an excellent display function over a long period of time, and an electric apparatus using the display device.

Means for Solving Problem

In order to attain the above-described object, the display device of the present invention is a display device including: a display space provided on a display surface side; and a colored liquid that is sealed inside the display space so as to be operable and is colored in a predetermined color, and the display device structured so as to be able to change a display color on the display surface side according to application of an electric field to the colored liquid, and wherein the colored liquid contains a conductive liquid as a dispersion medium and a pigment of a self-dispersing type as a coloring agent.

In the colored liquid in the display device that is constituted as described above, since the pigment is contained as the coloring agent in the above-described conductive liquid, the migration does not occur unlike the case of using a dye as the coloring agent, so that display colors with a high brightness can be displayed, thus improving the display quality on the display surface. Moreover, since the pigment of the self-dispersing type is used, dispersion stability of the pigment particles in the colored liquid can be improved significantly, so that the driving characteristics of the colored liquid can be stabilized and the favorable driving characteristics can be maintained. Accordingly, the excellent displaying function can be maintained over a long period of time, and the durability can be enhanced.

Moreover, in the above-described display device, it is preferable that a transparent upper layer provided on the display surface side; and a light-scattering layer provided such that the display space is formed between the upper layer and the light-scattering layer are included, and the display color on the display surface side is changed selectively between a predetermined color resulted from the colored liquid and white resulted from the light-scattering layer.

In this case, according to the simple configuration, the display device that can change the display color on the display surface side between the predetermined color and white can be structured. Moreover, since the white display is achieved by the light-scattering layer, the display quality of the white display can be improved easily.

Moreover, in the above-described display device, it is possible that a lower layer provided on a non-display surface side of the light-scattering layer is included, an upper space constituting the display space is formed between the upper layer and the light-scattering layer, a lower space that is connected with the upper space via a communication space provided so as to penetrate the light-scattering layer is provided between the light-scattering layer and the lower layer, and the display device includes a transparent upper electrode provided on a surface side of the upper space side in at least one of the upper layer and the light-scattering layer, a common electrode provided in the light-scattering layer so as to surround the communication space, a lower electrode provided on a surface side of the lower space side in at least one of the light-scattering layer and the lower layer, and a driver that includes an upper switch connected between the upper electrode and the common electrode, a lower switch connected between the lower electrode and the common electrode and a power supply, and changes the display color on the display surface side by moving the colored liquid toward the upper space side or the lower space side according to operations each of closing/opening the upper switch and the lower switch.

In this case, the display color on the display surface side is changed into the predetermined color or white according to the operations each of closing/opening the upper switch or the lower switch, the moving speed of the colored liquid toward the upper space (display space) side can be increased easily.

Moreover, in the above-described display device, the light-scattering layer is provided with a liquid storage space whose one end is connected with the display space, and the display device includes a transparent first electrode provided on a surface side of the display space side in at least one of the upper layer and the light-scattering layer, a second electrode provided in the light-scattering layer so as to surround the liquid storage space, and a driver that has a switch and a power supply connected between the first electrode and the second electrode, and changes the display color on the display surface side by moving the colored liquid toward the display space side or the liquid storage space side according to operations of closing/opening the switch.

In this case, the compact display device with a simple configuration can be structured more easily.

Moreover, the above-described display device may include a transparent planer electrode provided on a surface side of the display space side in one of the upper layer and the light-scattering layer; a needle electrode that protrudes from the other of the upper layer and the light-scattering layer into the display space; and a driver that has a switch and a power supply connected between the planar electrode and the needle electrode, and changes the display color on the display surface side by increasing/decreasing a surface area of the colored liquid inside the display space according to operations of closing/opening the switch.

In this case, the more compact display device with the simpler configuration can be structured. In addition, a speed of changing the display color can be increased easily.

Moreover, in the above-described display device, it is preferable that an insulating fluid that is not blended in the colored liquid is sealed inside the display space.

In this case, the moving speed of the colored liquid can be increased easily. Moreover, as the insulating fluid, a fluid that is transparent or colored in a different color from the above-described predetermined color (the color of the colored liquid), for example, a nonpolar oil that contains one or plural kinds selected from the group consisting of side-chain higher alcohol, side-chain higher fatty acid, alkane, a silicone oil and a matching oil is preferably used. The reason for this is because, in the case of using the nonpolar oil that is not compatible with the colored liquid as described above, the colored liquid can be moved at a higher speed than the case of using other insulating fluid such as the air, and the speed of changing the display color on the display surface side can be increased easily.

Moreover, in the above-described display device, it is preferable that the pigment is of a self-dispersing type in which a functional group for increasing an affinity for the conductive liquid is bonded to a surface of a particle of the pigment directly or via other atomic group.

In this case, since the above-described functional group is used for the pigment of the self-dispersing type, the dispersion stability of the pigment particles in the colored liquid can be improved more significantly, and the driving characteristics of the colored liquid can be stabilized more, thereby maintaining the more preferred driving characteristics reliably.

Moreover, in the above-described display device, the pigment has the surface of the particle that is subjected to modification treatment, and contains at least one kind selected from the group consisting of a carboxyl group, a hydroxyl group, a carbonyl group, a sulfone group, a hydroxyl group and a phosphate group, and is a self-dispersing type having a functional group for increasing the affinity for the conductive liquid.

In this case, the pigment of the self-dispersing type having the above-described functional group can be obtained easily. Moreover, as the above-described modification treatment, known surface modification treatment such as acid-base treatment, coupling agent treatment, polymer graft treatment, plasma treatment and oxidation/reduction treatment can be applied. More specifically, according to the experiments performed by the inventors of the present invention, the polymer graft treatment is most preferable.

Moreover, in the above-described display device, electrification of the particle of the pigment is +20 mV or more, or −20 mV or less in zeta potential value.

In this case, since the particles of the pigment are electrified appropriately even when using water as the dispersion medium, the particles can be dispersed appropriately in the dispersion medium. Thereby, the dispersibility of the particles can be increased without blending a dispersion stabilizing additive.

Moreover, in the above-described display device, a volume average particle diameter of the particles of the pigment is 5 μm or less.

In this case, even when storing the colored liquid for a long period of time, the sedimentation of the pigment in the dispersion medium can be prevented.

Moreover, in the above-described display device, it is preferable that a coefficient of a variation of a volume particle size distribution of the particles of the pigment is 50 or less.

In this case, the aggregation and the sedimentation of the particles can be prevented in a wide temperature range, in particular, in a higher temperature range, and the long-time durability can be secured.

Moreover, in the above-described display device, it is preferable that a content of the pigment in the colored liquid is 50 wt % or less with respect to a total weight % of the colored liquid.

In this case, the dispersion stabilization of the pigment can be achieved with respect to the colored liquid reliably.

Moreover, in the above-described display device, it is preferable that the conductive liquid is an ionic liquid containing an ambient temperature molten salt obtained by combining a cation and an anion.

In this case, the ambient temperature molten salt, which is the ionic liquid having a melting point of the room temperature (about 25° C.) or lower, is used as the conductive liquid, and the colored liquid that is nonvolatile, has a vapor pressure of 0, and has a wide liquid temperature region and an excellent thermal stability can be obtained. Moreover, because of its wide using temperature range, the colored liquid that can be prevented from leakage and ignition can be obtained. Further, since this ionic liquid has high ionic conductivity and a low viscosity, the colored liquid having various physical excellent properties such as a capability of low-voltage driving can be obtained.

More preferably most of the molten salts are hydrophilic, but it is preferable to use a nonaqueous ionic liquid that does not contain water, because it can reliably prevent the occurrence of insulation breakdown and breakage of the display device caused by the volume expansion due to the vapor pressure when using the ionic liquid containing water. Moreover, in the above-described display device, it is preferable that a melting point of the ionic liquid ranges from −4° C. to −90° C.

In this case, the ionic liquid that is solid in the above-described room temperature is eliminated, the conductive liquid can be structured reliably. More specifically, the ionic liquid that has high ionic conductivity even when reaching a low temperature range, for example, EMIF-2.3HF or the like is used preferably.

Also, in the above-described display device, an electrolyte of the ionic liquid is formed of a 1-1 salt obtained by combining one kind of the cation that is monovalent and one kind of the anion that is monovalent.

That is, in the ionic liquid, since an electrostatic interaction between the cation and the anion is in proportion to the product of electric charges, the interaction between the ions can be reduced so as to decrease a melting point and a viscosity by selecting each one kind of the cation that is monovalent and the anion that is monovalent, and low temperature characteristics can be improved as a low temperature molten salt.

Also, in the above-described display device, the cation may be selected from the group consisting of a 1,3-dialkylimidazolium cation, a N-alkylpyridinium cation, a tetraalkylammonium cation and a tetraalkylphosphonium cation.

More specifically, the 1,3-dialkyhmidazolium cation, the N-alkylpyridinium cation, the tetraalkylammonium cation and the tetraalkylphosphonium cation are compounds that will be represented by Chemical Formulae 1 to 4, respectively.

[Chemical Formula 1]

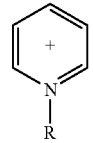

[Chemical Formula 2]

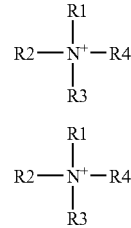

[Chemical Formula 3]

[Chemical Formula 4]

It should be noted that R1 and R2 in Chemical Formula 1 above, R in Chemical Formula 2, R1, R2, R3 and R4 in Chemical Formula 3 and R1, R2 R3 and R4 in Chemical Formula 4 are alkyl groups that are independent on one another. Moreover, this alkyl group can have, for example, 1 to 10 carbon atoms and preferably 1 to 6 carbon atoms. The alkyl group having 1 to 10 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl, n-heptyl, 2-methylhexyl, n-octyl, 2-methylheptyl, n-nonyl, 2-methyloctyl, n-decyl, 2-methylnonyl or the like. Further, the alkyl group having 1 to 6 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl or the like.

Also, in the above-described display device, the anion may be selected from the group consisting of $(AlCl_3)nCl^-$, $(AlBr_3)nBr^-$, $Cl^-$, $Br^-$, $I^-$, $(HF)nF^-$, $(HF)_2F_3^-$, $BF_4^-$, $AlF_4^-$, $PF_6^-$, $AsF_6^-$, $SbF_6^-$, $NbF_6^-$, $TaF_6^-$, $CH_3SO_3^-$, $WF_7^-$, $NO_3^-$, $NO_2^-$, $VOCl_4^-$, $CF_3SO_2^-$, $(CF_3SO_2)_2N^-$, $(CF_3SO_2)_3C^-$, $C_4H_9SO_3^-$, $(CF_3CF_2SO_2)N^-$, $CF_3CO_2^-$, $CF_3CF_2CF_2CO^-$, $CF_3CF_2CF_2SO_3^-$, $(CN)_2N^-$ and $CH_3CO_2^-$. Herein, n is an integer.

Moreover, in the above-described display device, it is preferable that the ionic liquid contains a chemical species selected from the group consisting of chemical compounds represented by the structural formulae below.

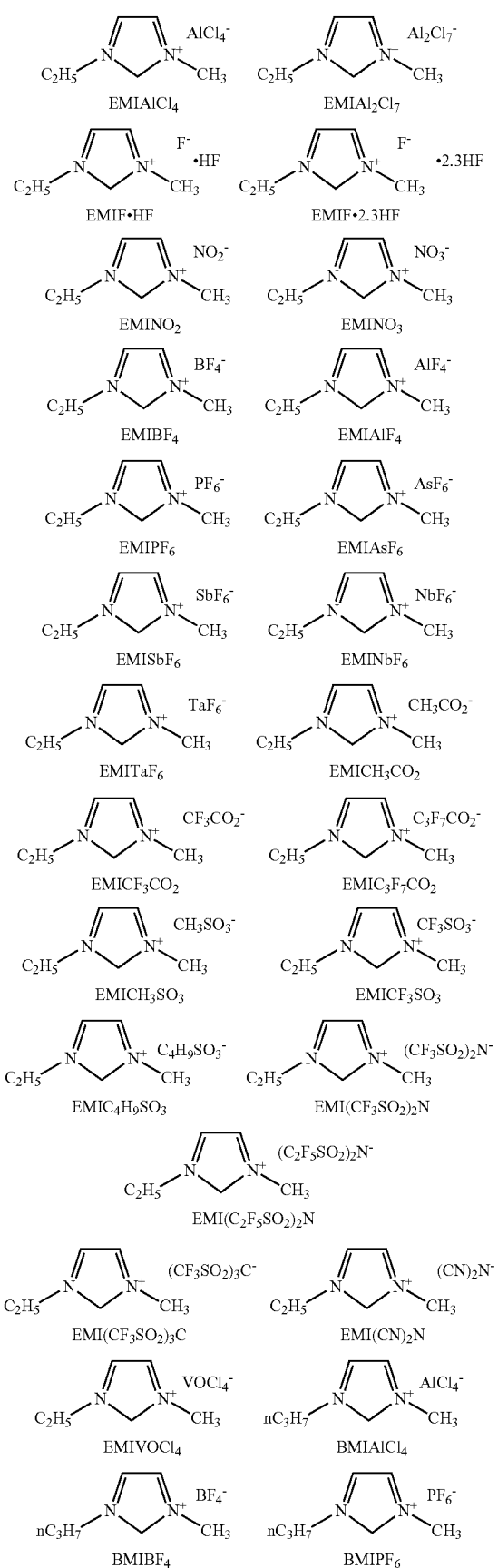
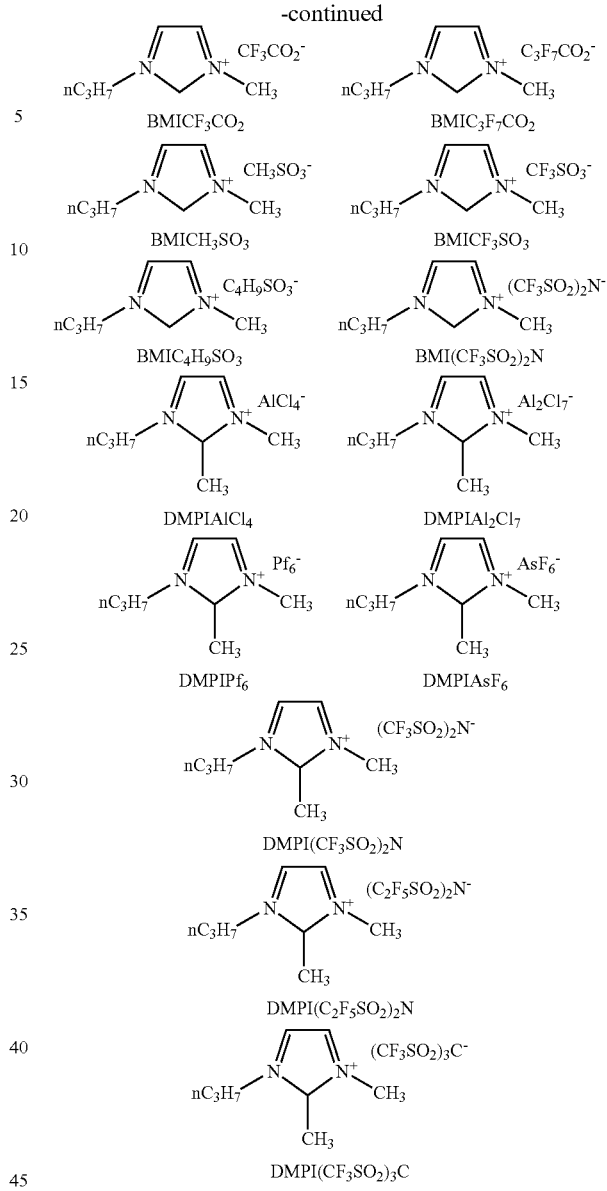

That is, the above-described EMI, BMI and DMPI are stable with respect to the air and water and have high ionic conductivity, and thus enable the ionic liquid to move at a low voltage and a high speed, thus being used preferably. In particular, as the same anion, the compound having EMI+ exhibits a maximum electric conductivity at the room temperature, and can improve the driving characteristics of the colored liquid easily.

Moreover, in the above-described display device, it is preferable that an ionic conductivity (s/cm) of the ionic liquid at 25° C. is $0.1 \times 10^{-3}$ or more.

In this case, the colored liquid can be moved easily, and the colored liquid can be moved at a low voltage, thereby improving the driving characteristics of this colored liquid.

Moreover, in the above-described display device, it is preferable that a viscosity of the colored liquid at 25° C. is 300 cp or less.

In this case, the colored liquid can be driven at the low voltage of about 50V or less.

Moreover, in the above-described display device, it is preferable that a surface tension of the colored liquid ranges from 40 mN/m to 75 mN/m.

In this case, the driving characteristics of the colored liquid can be prevented from being decreased significantly.

Moreover, in the above-described display device, it is preferable that a plurality of the display spaces are provided respectively for a plurality of primary colors that enable a full color display on the display surface side.

In this case, the driver moves the conductive liquids that correspond to the plurality of the respective display spaces appropriately, so that the color images can be displayed.

Moreover, the electric apparatus of the present invention is an electronic apparatus including a display portion for displaying information containing a character and an image, wherein any one of the display devices described above is used for the display portion.

In the electric apparatus structured as described above, since the display device with the improved display quality and the enhanced durability that can maintain the excellent displaying function over a long period of time is used for the displaying portion, the electric apparatus provided with the long-life display portion that has the excellent displaying function even when displaying moving images can be structured easily.

Effects of the Invention

The present invention can provide a display device that can improve display quality and has enhanced durability which enables to maintain an excellent displaying function over a long period of time, and an electric apparatus using the display device.

DESCRIPTION OF THE INVENTION

Preferred embodiments of the display device and the electric apparatus according to the present invention will be described below with reference to the drawings. In the below description, a case where the present invention is applied to an image display provided with a display portion that can display color images will be exemplified for explanation.

Embodiment 1

Figure 1:
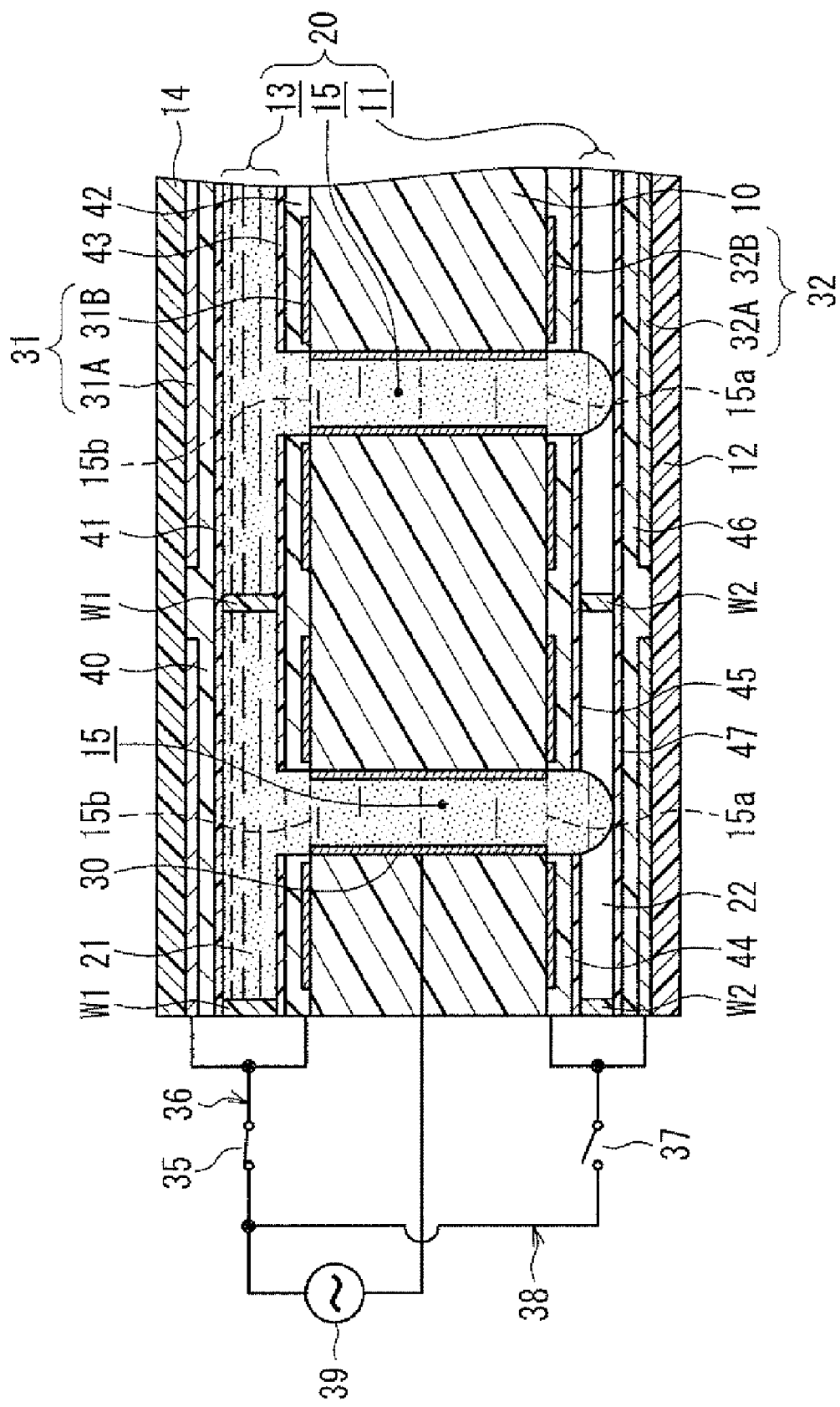
FIG. 1 is a cross-sectional view showing a configuration of a main part of a display device and an image display according to Embodiment 1 of the present invention in a state of displaying a color resulting from a colored liquid.
Figure 2:
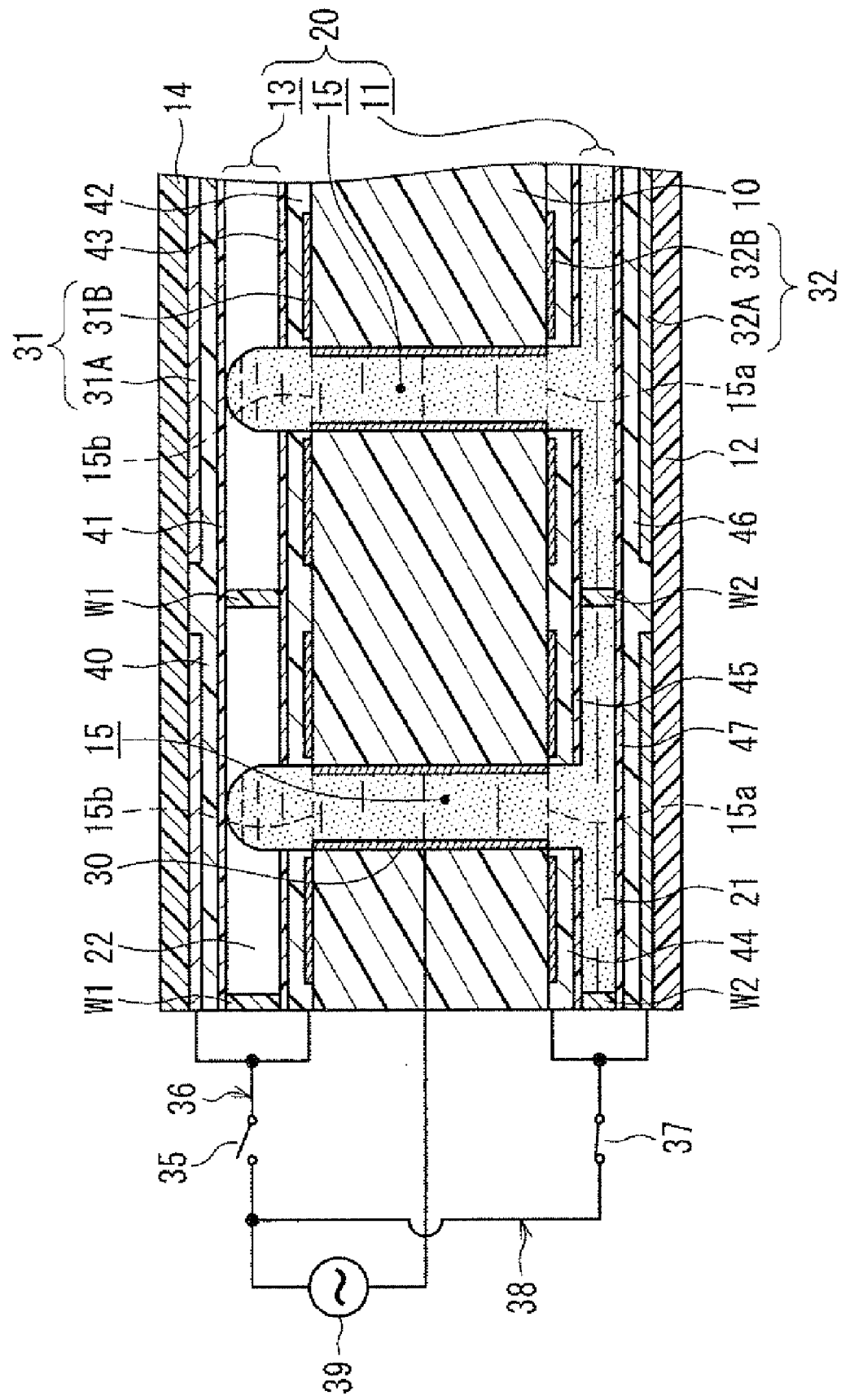
FIG. 2 is a cross-sectional view showing the configuration of the main part of the display device and the image display in a state of displaying white.

FIG. 1 is a cross-sectional view showing a configuration of a main part of a display device and an image display according to Embodiment 1 of the present invention in a state of displaying a color resulting from a colored liquid. FIG. 2 is a cross-sectional view showing the configuration of the main part of the display device and the image display in a state of displaying white.

In FIGS. 1 and 2, the image display according to the present embodiment is provided with a display portion constituted of the display device according to the present invention. In this display portion, an upper side in the figure corresponds to a display surface side recognized visually by a user. The above-noted display device includes a light-scattering sheet 10 for scattering external light from the display surface side so as to display white, a lower electrode substrate 12 provided on a non-display surface side of the light-scattering sheet 10 such that a lower space 11 with a rectangular-parallelepiped shape is formed between the light-scattering sheet 10 and the lower electrode substrate 12, and an upper electrode substrate 14 provided on a display surface side of the light-scattering sheet 10 such that an upper space 13 with a rectangular-parallelepiped shape is formed between the light-scattering sheet 10 and the upper electrode substrate 14. The light-scattering sheet 10 and the lower electrode substrate 12 are formed of an insulating material and respectively constitute a light-scattering layer and a lower layer. Moreover, the upper electrode substrate 14 is formed of a transparent insulating material, and constitutes a transparent upper layer that is provided on the display surface side. Further, in the display device, the upper space 13 and the lower space 11 are partitioned off by a plurality of partition walls W1 and W2, respectively, so that a plurality of pixel regions are formed in a transverse direction of the figure and a direction perpendicular to the paper surface of the figure. Moreover, in the display device, the pixel regions for individual colors of R, G and B are provided so as to be adjacent to one another as a single picture element, for example, thus allowing a full-color display on the above-noted display surface side.

In a central portion of each of the pixel regions of the light-scattering sheet 10, a through hole 15 penetrating the light-scattering sheet 10 in its thickness direction (the vertical direction in the figures) is provided. This through hole 15 constitutes a communication space, and one end thereof is connected with the upper space 13 constituting a display space. Moreover, other end of the through hole 15 is connected with the lower space 11, and the upper space 13 and the lower space 11 are connected with each other via the through hole 15. In other words, a lower end opening 15$a$ of the through hole 15 is provided so as to face the lower electrode substrate 12, and the upper end opening 15$b$ is provided so as to face the upper the upper electrode substrate 14, so that a liquid storage portion 20 having an I-shaped cross-section is constituted of the through hole 15, the lower space 11 and the upper space 13 for each pixel.

In the liquid storage portion 20, a colored liquid 21 that is colored in the predetermined color and a nonpolar oil 22 are sealed. The colored liquid 21 includes a conductive liquid as a dispersion medium, for example, a nonaqueous ionic liquid, and a pigment of a self-dispersing type as a coloring agent (detailed description will be provided below).

The nonpolar oil 22 has a property of not blending in the colored liquid 21, and an oil containing one or plural kinds selected from the group consisting of side-chain higher alcohol, side-chain higher fatty acid, alkane, a silicone oil and a matching oil that are transparent or colored in a color different from that of the colored liquid 21 is used as the nonpolar oil 22. As described above, by using the nonpolar oil 22 that is not compatible with the colored liquid 21, a liquid drop of the colored liquid 21 is moved in the nonpolar oil 22 more easily, and it is possible to move the colored liquid 21 at a high speed.

Moreover, in the two adjacent liquid storage portions 20 that are partitioned off by the partition walls W1 and W2, the colored liquids 21 that are colored in different colors are sealed respectively. That is, a pigment of a self-dispersing type (coloring agent) of either R, G or B is added to the colored liquid 21, and a display color on the display surface side that corresponds to the color of R, G or B can be displayed.

Also, in the display device, for the purpose of applying a voltage to or removing a voltage from the colored liquid 21 so as to move the colored liquid 21 and replace it with the nonpolar oil 22, the display device has a three-terminal structure for each pixel, which includes a common electrode 30 that is provided so as to surround the through hole 15, a transparent upper electrode 31 that is provided on the upper space 13 side, and the lower electrode 32 that is provided on the lower space 11 side.

More specifically the common electrode 30 is provided along an inner surface of the through hole 15. This common electrode 30 is a metal electrode made of aluminum, copper or the like, and is formed by a vacuum evaporation method, a sputtering method, an ion plating method, a dip coating method or the like.

Moreover, on a lower surface of the upper electrode substrate 14, an upper side upper electrode 31A is provided so as to cover the display surface side of the upper space 13. Further, on the light-scattering sheet 10 side, a lower-side upper electrode 31B is provided on a surface facing the upper space 13 except the opening of the through hole 15. These upper electrodes 31A and 31B are transparent electrodes using ITO films or the like, and are connected electrically to each other. Incidentally, the upper electrodes 31 may be provided on the surface side of the upper space 13 side in at least one of the upper electrode substrate 14 and the light-scattering sheet 10.

Moreover, on an upper surface of the lower electrode substrate 12, a lower-side lower electrode 32A is provided so as to cover a non-display surface side of the lower space 11. Further, on the light-scattering sheet 10 side, an upper-side lower electrode 32B is provided on a surface facing the lower space 11 except the opening of the through hole 15. These lower electrodes 32A and 32B are metal electrodes made of aluminum, copper or the like, and are formed by a vacuum evaporation method, a sputtering method, an ion plating method, a dip coating method or the like. Incidentally, the lower electrodes 32 may be provided on the surface side of the lower space 11 side in at least one of the lower electrode substrate 12 and the light-scattering sheet 10.

Moreover, the upper electrode 31 and the common electrode 30 are connected to an alternating-current power supply 39 via an upper switch 35, and an upper-side power supply circuit 36 is constituted of the upper electrode 31, the common electrode 30, the upper switch 35 and the alternating-current power supply 39. Whereas, the lower electrode 32 and the common electrode 30 are connected to the alternating-current power supply 39 via a lower switch 37, and a lower-side power supply circuit 38 is constituted of the lower electrode 32, the common electrode 30, the lower switch 37 and the alternating-current power supply 39. And, in the display device, the application of the electric field to the colored liquid 21 is performed and stopped according to the operations each of closing/opening the upper switch 35 and the lower switch 37. Also, the upper-side power supply circuit 36 and the lower-side power supply circuit 38 constitute a driver for changing a display color on the display surface side by moving the colored liquid 21 toward the upper space 13 side or the lower space 11 side according to the operations each of closing/opening the upper switch 35 and the lower switch 37, and the colored liquid 21 is moved by the electrowetting phenomenon.

The surfaces of the upper electrodes 31A and 31B are provided with dielectric layers 40 and 42, respectively. Also, surfaces of the dielectric layers 40 and 42 are provided with insulating water-repellent films 41 and 43, respectively, which are in contact with the colored liquid 21 or the nonpolar oil 22.

Similarly, the surfaces of the lower electrodes 32A and 32B are provided with dielectric layers 46 and 44, respectively. Also, surfaces of the dielectric layers 46 and 44 are provided with insulating water-repellent films 47 and 45, respectively, which are in contact with the colored liquid 21 or the nonpolar oil 22.

The dielectric layers 40, 42, 44 and 46 are formed of a high dielectric film containing parylene or aluminum oxide, for example, and have a layer thickness ranging from about 1 μm to 0.1 μm. Also, the water-repellent films 41, 43, 45 and 47 preferably become layers having an affinity for the colored liquid 21 at the time of applying a voltage. More specifically, a fluorocarbon resin is preferable.

Alternatively to the above description, the surface of the common electrode 30 also can be provided with a coating that becomes lipophilic in an ON (closed) state of the upper switch 35 or the lower switch 37, and becomes lipophobic in an OFF (opened) state of the upper switch 35 or the lower switch 37, thereby improving a moving speed of the nonpolar oil 22 at the time of the operations of closing/opening the upper switch 35 or the lower switch 37, so that the moving speed of the colored liquid 21 can be raised as well. However, as shown in FIGS. 1 and 2, it is more preferable that the colored liquid 21 is constantly in contact with the common electrode 30 regardless of the operations of closing/opening the upper switch 35 or the lower switch 37 so as to apply the voltage to this colored liquid 21 directly, because the moving speed of the colored liquid 21 can be improved easily.

As the light-scattering sheet 10, a scattering reflector containing a transparent polymeric resin and plural kinds of fine particles that are added into the polymeric resin and have different refractive indices is used. Thus, when the colored liquid 21 flows out from the inside of the upper space 13 and the transparent nonpolar oil 22 flows into the upper space 13, it is possible to display the display surface in white like a paper. More specifically, in the light-scattering sheet 10, the above-noted polymeric resin can be a thermoplastic resin or a thermosetting resin, for example, an epoxy resin, an acrylic resin, a polyimide resin, a polyamide resin, polycarbonate, Teflon (registered trademark) or the like. Also, in the light-scattering sheet 10, fine particles of titanium oxide or alumina having a large refractive index and hollow polymer fine particles having a small refractive index are contained as the above-noted plural kinds of fine particles. They cause diffusion on the surface of the light-scattering sheet 10, making it possible to achieve a color of white like a paper.

Alternatively to the above description, a light-scattering sheet using glass, ceramic or the like can also be used.

Further, the above-described through hole 15 has a diameter of about 0.1 μm to 100 μm, and can raise the intensity of the electric field generated in the through hole 15 in the ON state of the upper switch 35 or the lower switch 37. This makes it possible to increase the moving speed of the colored liquid 21 that is moved from the inside of the through hole 15 and ejecting toward the upper space 13 side or the lower space 11 side by the electrowetting phenomenon.

Moreover, the light-scattering sheet 10 has a thickness of preferably about 10 μm to 300 μm, more preferably 10 μm to 100 μm and particularly preferably about 50 μm. By setting the thickness of the light-scattering sheet 10 to be very small, which is 1 mm or less, as above, it becomes possible to structure a so-called paper display easily.

When the light-scattering sheet 10 is set to have a thickness of 10 μm to 300 μm, the length of the through hole 15 in the vertical direction in the figure also is 10 μm to 300 μm. Thus, the colored liquid 21 can be flown in and out of the through hole 15 having a diameter of 0.1 μm to 100 μl and a length of 10 μm to 300 μm at a high speed by the electrowetting phenomenon.

The through hole 15 can be formed by a suitable method such as a photolithography method, an anodic oxidation method, an etching method, a dyeing method or a printing method.

The upper electrode substrate 14 and the lower electrode substrate 12 are formed of a transparent resin sheet similar to the light-scattering sheet 10 so as to have a thickness of 100 μm to 1000 μm. Also, the upper space 13 and the lower space 11 respectively have an interval of 5 μm to 1000 μm in the vertical direction of the figure. It should be noted that this interval is the corresponding dimension between the water-repellent films 41 and 43 or between the water-repellent films 45 and 47.

Here, the colored liquid 21 according to the present embodiment will be described specifically.

Firstly, the pigment of the self-dispersing type will be described with reference to FIGS. 3 and 4.

Figure 3:
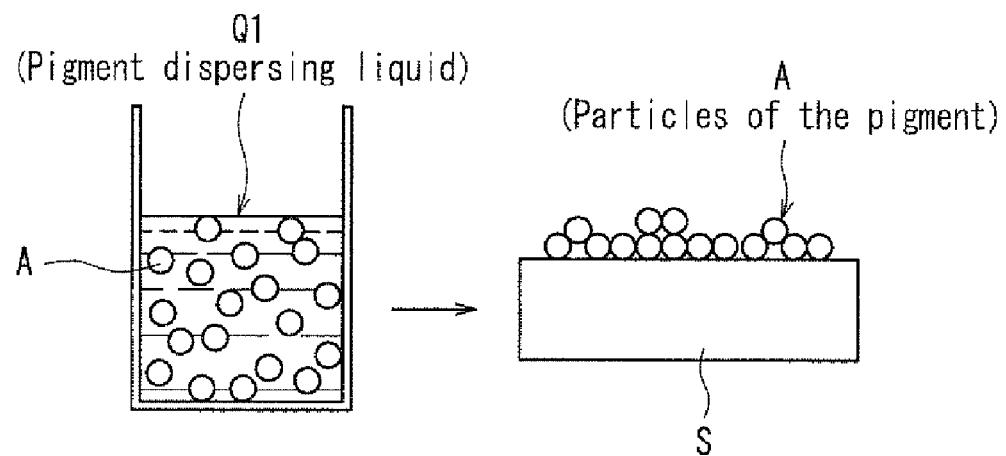
FIG. 3 is a view for explaining a case of using a pigment as the colored liquid.
Figure 4:
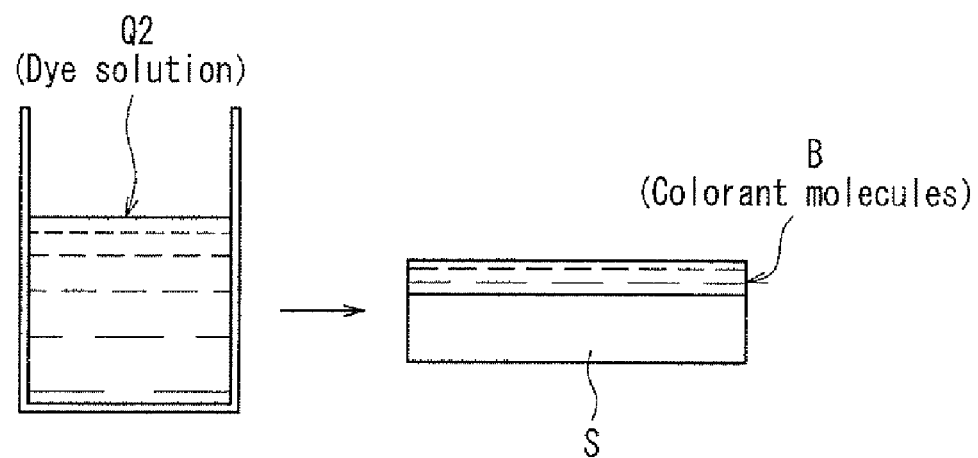
FIG. 4 is a view for explaining a case of using a dye as the colored liquid.

FIG. 3 is a view for explaining a case of using a pigment as the colored liquid, and FIG. 4 is a view for explaining a case of using a dye as the colored liquid.

As a representative coloring agent used for coloring a liquid, a pigment and a dye are known. Herein, in the case of showing the pigment as shown in FIG. 3, particles A of the pigment are dispersed without being dissolved in a liquid serving as the dispersion medium so as to become a pigment dispersing liquid Q1, and are absorbed while maintaining their state of the particles A, for example, in the case of being printed on a paper S, thereby providing a color of the particles A.

On the other hand, in the case of using the dye, colorant molecules B of the dye are dissolved in the liquid serving as the dispersion medium so as to become a dye solution Q2 shown in FIG. 4, and the color thereof is absorbed in a state of the colorant molecules B, for example, in the case of being printed on the paper S.

As described above, in the case of using the pigment, the color of the particles of the pigment themselves can be achieved, but in the case of using the dye, the color becomes faint, and sharpness of the color display is degraded. That is, in the case of using the pigment as the coloring agent, the display colors on the display surface side can be reproduced with the sharper colors, compared with the case of using the dye.

In particular, the colored liquid that is colored by the pigment and the colored liquid that is colored by the dye have significantly different physical properties in the case of being used in a liquid state. That is, in the display device utilizing the electrowetting phenomenon of the present embodiment, the physical properties of the colored liquid itself and an interactive power between the colored liquid and a solid such as the above-described dielectric layer are significantly important factors, and these factors are largely dependent on the coloring agent that is added into the colored liquid. Thus, the selection of the coloring agent is significantly important for the display device utilizing the electrowetting phenomenon.

More specifically, in the case of using a dye that disperses molecules in the dispersion medium (conductive liquid) as the coloring agent of the colored liquid, in the display device utilizing the electrowetting phenomenon, below-described problems (1) to (4) may occur.

(1) Since the colored liquid is largely dependent on the molecular structure of the dye, a surface tension thereof differs depending on a kind (color) of the dye largely.

(2) Chemical interaction occurs between the dye molecules and the above-described solid, and the dye molecules penetrate the solid, so that migration by which the dye is adhered to the solid is likely to occur.

(3) Due to the molecular dispersion, sufficient coloring cannot be obtained at a low concentration.

(4) Because of low light resistance, long-time use is difficult.

On the other hand, in the case of using the pigment as the coloring agent of the colored liquid, when dispersing the untreated particles in the dispersion medium, the sufficient dispersion stability cannot be obtained, and sedimentation, migration to the solid and the like occur, so that the long-time use is difficult. Thus, a dispersion stabilizing additive is essential. The dispersion stabilizing additive is a material that has a hydrophilic group and a lipophilic group in its molecule and functions to degrade an interfacial tension significantly by being absorbed to an interface. Thus, when the dispersion stabilizing additive is absorbed to the pigment particles, the particles are likely to be wet with respect to the dispersion medium so as to be dispersed in the dispersion medium stably.

However, in the display device utilizing the electrowetting phenomenon, by using a colored liquid that is colored by blending the pigment and the dispersion stabilizing additive, the dispersion stabilizing additive is adhered to the interface between the solid and the liquid so as to decrease the reliability of the interface significantly and change a surface energy of the colored liquid, so that the diving characteristics of the colored liquid may be changed significantly.

Thereby, in the colored liquid 21 of the present embodiment, not a dye but a pigment that disperses molecules in the dispersion medium is used as the coloring agent, thereby solving the above-described problems (1) to (4) that occur in the case of using the dye.

Moreover, the pigment is actually used, but the dispersion stabilizing additive is not used, and the pigment of the self-dispersing type obtained by performing modification treatment to the pigment for improving its dispersibility is used. Thereby, the dispersion stability of the particles of the pigment in the colored liquid 21 is improved significantly. As a result, the driving characteristics of the colored liquid 21 are stabilized, so that the preferred driving characteristics can be obtained.

Moreover, the kind of the pigment is not limited particularly, and known inorganic pigments and organic pigments can be used.

Examples of the inorganic pigment include titanium oxide, iron oxide, and carbon black that is manufactured by known methods such as a contact method, a Furness method and a thermal method.

Examples of the organic pigment include azo pigments (azo lake, insoluble azo pigments, condensed azo pigments, chelate azo pigments and the like), polycyclic pigments (phthalocyanine pigments, perylene pigments, perinone pigments, anthraquinone pigments, quinacridone pigments, dioxazine pigments, thioindigo pigments, isoindolinone pigments, quinofuranone pigments and the like), dye chelate (basic dye type chelate, acid dye type chelate and the like), nitro pigments, nitroso pigments and aniline black.

Moreover, the above-described pigments are of a self-dispersing type, in which a functional group for increasing an affinity for the dispersion medium (conductive liquid) is bonded to the particle surface of the pigment directly or via other atomic group. Because of using such a functional group, the dispersion stability of the particles of the pigment in the colored liquid 21 can be improved more significantly, thereby stabilizing the driving characteristics of the colored liquid 21 more and maintaining the preferable driving characteristics reliably.

Moreover, in the above-described pigments, the particle surface is subjected to the modification treatment, is made to become the self-dispersing type that includes at least one kind selected from a carboxyl group, a hydroxyl group, a carbonyl group, a sulfone group, a hydroxyl group and a phosphate group, and have a functional group for increasing the affinity for the dispersion medium. Thereby, the pigment of the self-dispersing type having the above-described functional group can be obtained easily. Moreover, as the modification treatment, known surface modification treatment such as acid-base treatment, coupling agent treatment, polymer graft treatment, plasma treatment and oxidation/reduction treatment can be applied as appropriate. Among them, the polymer graft treatment is applied more preferably.

As a general-purpose pigment ink for ink jet, a pigment that is subjected to microcapsulation treatment is used typically. However, the microcapsulated pigment has higher fixity with respect to prints, compared with the pigment of the self-dispersing type, but migration toward the solid is likely to occur due to the high fixity. Thus, the colored liquid 21 does not adopt the surface treatment for microcapsulating the particles of the pigment.

Moreover, in the pigment, electrification of the particles is +20 mV or more or −20 mV or less, and more preferably is +30 mV or more or −30 mV or less in zeta potential value. Thereby, since the particles of the pigment are electrified appropriately even when using water as the dispersion medium, the particles can be dispersed in the dispersion medium appropriately, so that the dispersibility of the particles can be increased without blending the dispersion stabilizing additive.

Moreover, the particles of the pigment whose volume average particle diameter of 5 μm or less are used, whereby the sedimentation of the pigments in the dispersion medium can be prevented even when the colored liquid 21 is stored over a long period of time. Moreover, the smaller volume average particle diameter is more preferable, which is preferably 3 μm or less, and is further preferably 1 μm, and a lower limit thereof is in a producible range, which is presently about 1 nm.

Moreover, the particles of the pigment are adjusted such that a coefficient of a variation of their volume particle size distribution is 50 or less, so that the aggregation and the sedimentation of the particles can be prevented in a wide temperature range, in particular, a high temperature region, and long-time durability can be secured. Incidentally, this coefficient of the variation is smaller the better. That is, since the coefficient of the variation is a numeral representing the variation, when the coefficient of the variation is smaller, the aggregation and the sedimentation of the particles can be prevented more. More specifically, the coefficient of the variation is preferably 20 or less, and is more preferably 5 or less. As described above, by setting the coefficient of the variation to be 5 or less, repeatability of the switching in the electrowetting system, that is, the durability can be improved.

On the other hand, a lower limit value of the coefficient of the variation is 0.1. The reason for this is because, in the case of using the particles having the coefficient of the variation of less than 0.1, an exceedingly long period of time is necessary for dispersing the pigment in the colored liquid in order to obtain uniformization of the composition, and thus it is not practical in production.

It should be noted that the volume average particle diameter and the coefficient of the variation of the volume particle size distribution of the particles of the pigment are measured by a dynamic light-scattering type particle diameter distribution meter (produced by HORIBA, Ltd., trade name: LB-550).

Moreover, a content of the pigment in the colored liquid 21 is set to be 50 wt % or less with respect to the total weight % of the colored liquid 21, which is structured such that the dispersion stabilization of the pigment with respect to the colored liquid 21 can be achieved reliably.

Moreover, in the case where the content of the pigment exceeds 50 wt %, the dispersion stabilization of the pigment becomes difficult, which may lead to a deterioration of storage stability of the colored liquid 21. Further, in the case of a low concentration, the dispersion stability of the pigment does not deteriorate. Thus, a lower limit value of the content of the pigment is about 0.001 wt %.

Further, as the pigment of the colored liquid 21, a commercially available pigment of the self-dispersing type may be used. Examples of this kind of commercially available pigment of the self-dispersing type include Cab-o-jet-200, Cab-o-jet-300, Cab-o jet-262M, Cab-o-jet-270Y and IJXT252 produced by Cabot Corporation, and MicrojetBlack CW-1 (trade name) produced by Orient Chemical Industries, Ltd. Incidentally the pigments of the self-dispersing type may be used alone or in combination of two kinds or more.

Next, examples of results of evaluation tests regarding the colored liquid 21 that are conducted by the inventors of the present invention will be described with reference to FIG. 5.

Figure 5A:
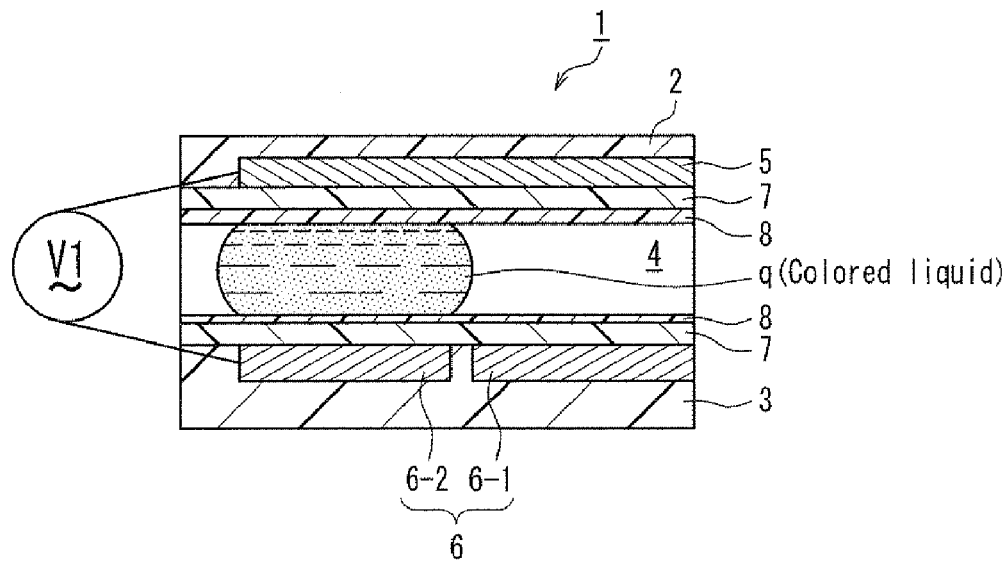
FIGS. 5A and 5B are views for explaining evaluation testing methods of the colored liquids in examples and a comparative example of the present embodiment.
Figure 5B:
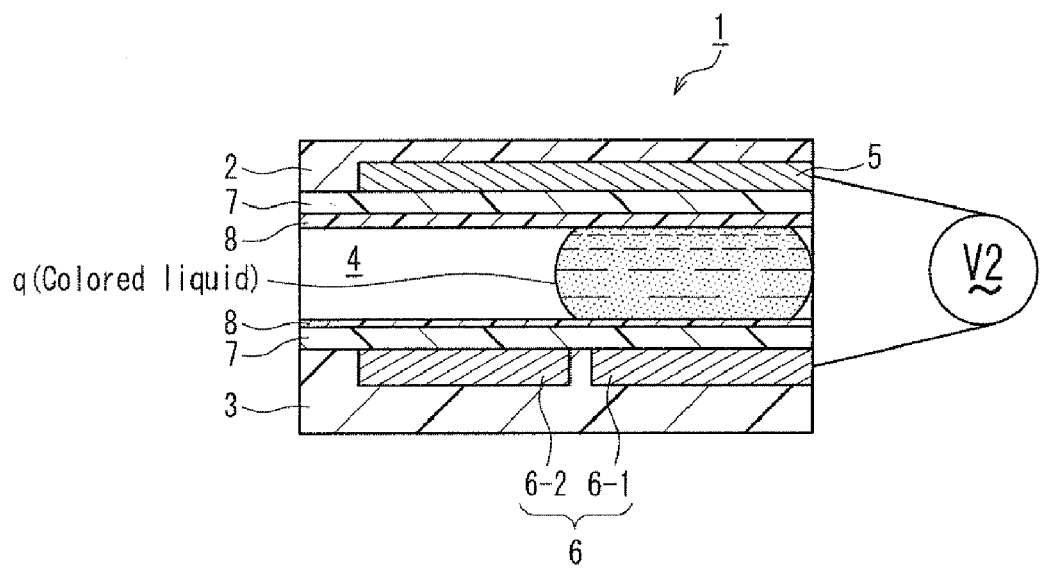

FIGS. 5A and 5B are views for explaining evaluation testing methods of the colored liquids in examples and a comparative example of the present embodiment.

In this evaluation test, the colored liquids 21 for the first example, the second example and the comparative example were prepared so as to evaluate presence or absence of occurrence of the migration toward a substrate (solid) and driving voltages.

(Colored Liquid of First Example)

As a coloring agent of a colored liquid in the first example, a pigment (ink) of the self-dispersing type made of CW-1 (produced by Orient Chemical Industries, Ltd.) was used. This CW-1 was a pigment of the self-dispersing type in which lactone and a carboxyl group were attached onto a particle surface of carbon black with the average particle diameter ranging from 60 nm to 70 nm.

Moreover, a KCL aqueous solution (1 mM/L) is used as the dispersion medium, and the above-described pigment of the self-dispersing type was blended into the KCL solution and was stirred so as to be dispersed homogeneously, so that the colored liquid of the first example was prepared. Incidentally, a content of the above-described pigment was 5 wt % with respect to 100 wt % of the prepared colored liquid.

(Colored Liquid of Comparative Example)

As the coloring agent of the colored liquid, a dispersing agent added pigment ink that was not subjected to the self-dispersion treatment, in which a dispersion stabilizing additive was blended, was used. Carbon black #10 (produced by Mitsui Chemicals Inc.) was used as the pigment, and a polymeric surfactant (styrene-maleic anhydride copolymer-based dispersing agent) was used as the dispersing agent for preparation.

And, an inside of a test cell shown in FIG. 5 was filled with a colored liquid (q) of the first example and the comparative example, and a voltage was applied thereto, thereby evaluating the presence or absence of the occurrence of the migration of the pigment toward the substrate and a driving voltage.

In FIG. 5, in the test cell 1, a display space 4 was provided between an upper substrate 2 and a lower substrate 3, and a first electrode 5 made of an ITO film was provided on a substantially all of a lower surface of the upper substrate 2 on an upper surface side of the display space 4. On an upper surface of the lower substrate 3 on the lower surface side, a second electrode 6 made of an ITO film was provided, and the second electrode 6 was separated laterally on right and left sides, thereby obtaining the right-sided second electrode 6-1 and the left-sided second electrode 6-2.

A non-alkali glass (produced by Asahi Glass Co. Ltd.) was used for the upper substrate 2 and the lower substrate 3, a high dielectric film 7 made of parylene was provided on the surfaces of the first electrode 5 and the second electrode 6, and a water-repellent film 8 made of a fluorocarbon resin (CYTOP (registered trademark) produced by Asahi Glass Co. Ltd.) was provided on a surface of the high dielectric film 7. Further, a power supply V1 was connected to the first electrode 5 and the second electrode 6-1, and a power supply V2 was connected to the first electrode 5 and the second electrode 6-2. Then, when a voltage was applied to the first electrode 5 and the second electrode 6-1, a voltage was not applied to the first electrode 5 and the second electrode 6-2, and a voltage was applied vice versa, which was repeated alternately, thereby driving the colored liquid that was filled in the display space 4 leftward and rightward as shown in FIGS. 5A and 5B.

Driving conditions were as follows.

Power supply: AC power, frequency: 1 kHz, measurement voltage: ±20 V, and driving time: 60 min.

(Evaluation of Migration)

In either of the case of filling the colored liquid of the first example and the case of filling the colored liquid of the comparative example into the display space 4 of the test cell 1, the presence or absence of the occurrence of the migration was evaluated by visual recognition.

In this evaluation, the migration did not occur in the colored liquid of the first example. On the other hand, in the colored liquid of the comparative example, the occurrence of the migration was observed. Thereby, it can be proven that, when using the pigment of the self-dispersing type as the coloring agent, the migration does not occur.

(Evaluation of Driving Voltage)

The colored liquid of the first example and the colored liquid of the comparative liquid were evaluated regarding their driving voltages.

As the test cell 1, the same cell as the test cell used for the evaluation of the migration was used.

The driving conditions were as follows. Power supply: AC power, and frequency: 1 kHz, A driving voltage was varied.

In the case of using the colored liquid of the first example, the driving voltage that can drive the colored liquid leftward and rightward was 20 Vpp (peak-to-peak) or less. On the other hand, in the case of using the colored liquid of the comparative example, when the driving voltage was 20 Vpp, the colored liquid was not moved leftward and rightward, and thus the voltage of more than 20 Vpp was necessary to be applied.

As is obvious from this result, in the case of using the dispersion stabilizing additive, degradation of the driving property was recognized. Further, it was also recognized that low-voltage driving of 20 Vpp or less can be achieved by using the pigment of the self-dispersing type.

(Colored Liquid of Second Example)

In this second example, the pigment of the self-dispersing type that is the same as that of the first example was used as the coloring agent of the colored liquid. Whereas, as the dispersion medium, an ionic liquid made of an ambient temperature molten salt formed of a 1-1 salt that is obtained by combining one kind of monovalent cation and one kind of monovalent anion (produced by Koei Chemical Co., Ltd.; trade name: IL-A4 or the like) was used.

In detail, the cation is selected from the group consisting of 1,3-dialkylimidazolium cation, N-alkylpyridinium cation, tetraalkylammonium cation and tetraalkylphosphonium cation.

More specifically, the above-described 1,3-dialkylimidazolium cation, N-alkylpyridinium cation, tetraalkylammonium cation and tetraalkylphosphonium cation are represented by below Chemical Formulae 1 to 4, respectively.

[Chemical Formula 1]

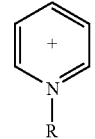

[Chemical Formula 2]

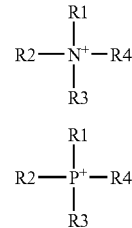

[Chemical Formula 3]

[Chemical Formula 4]

It should be noted that R1 and R2 in Chemical Formula 1 above, R in Chemical Formula 2, R1, R2, R3 and R4 in Chemical Formula 3 and R1, R2 R3 and R4 in Chemical Formula 4 are alkyl groups that are independent on one another. Moreover, this alkyl group can have, for example, 1 to 1.0 carbon atoms and preferably 1 to 6 carbon atoms. The alkyl group having 1 to 10 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl, n-heptyl, 2-methylhexyl, n-octyl, 2-methylheptyl, n-nonyl, 2-methyloctyl, n-decyl, 2-methylnonyl or the like. Further, the alkyl group having 1 to 6 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl or the like.

Further, in the above-described display device, the anion may be selected from the group consisting of (AlC$_3$)nCl$^-$, (AlBr$_3$)nBr$^-$, Cl$^-$, Br$^-$, I$^-$, (HF)nF$^-$, (HF)$_2$F$_3^-$, BF$_4^-$, AlF$_4^-$, PF$_6^-$, AsF$_6^-$, SbF$_6^-$, NbF$_6^-$, TaF$_6^-$, CH$_3$SO$_3^-$, WF$_7^-$, NO$_3^-$, NO$_2^-$, VOCl$_4^-$, CF$_3$SO$_3^-$, (CF$_3$SO$_2$)$_2$N$^-$, (CF$_3$SO$_2$)$_3$C$^-$, C$_4$H$_9$SO$_3^-$, (CF$_3$CF$_2$SO$_2$)N$^-$, CF$_3$CO$_2^-$, CF$_3$CF$_2$CO$^-$, CF$_3$CF$_2$CF$_2$SO$_3^-$, (CN)$_2$N$^-$ and CH$_3$CO$_2^-$. It should be noted that the above-described n is an integer.

Moreover, in the above-described display device, the ionic liquid preferably include a chemical species selected from the compounds with the structural formulae described below.

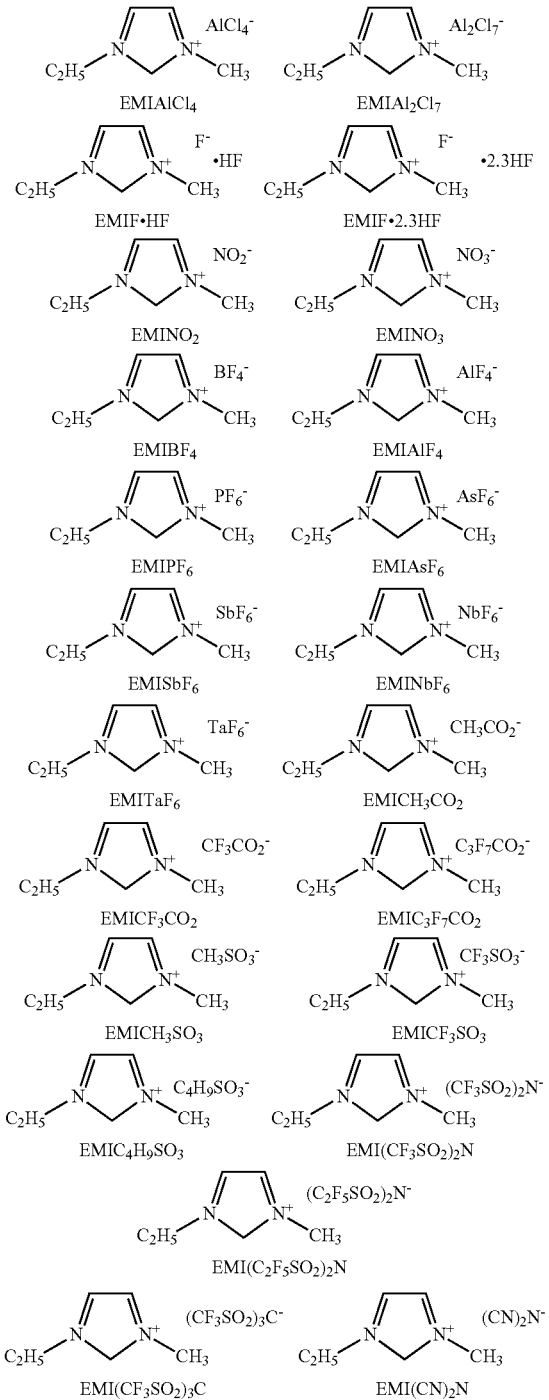

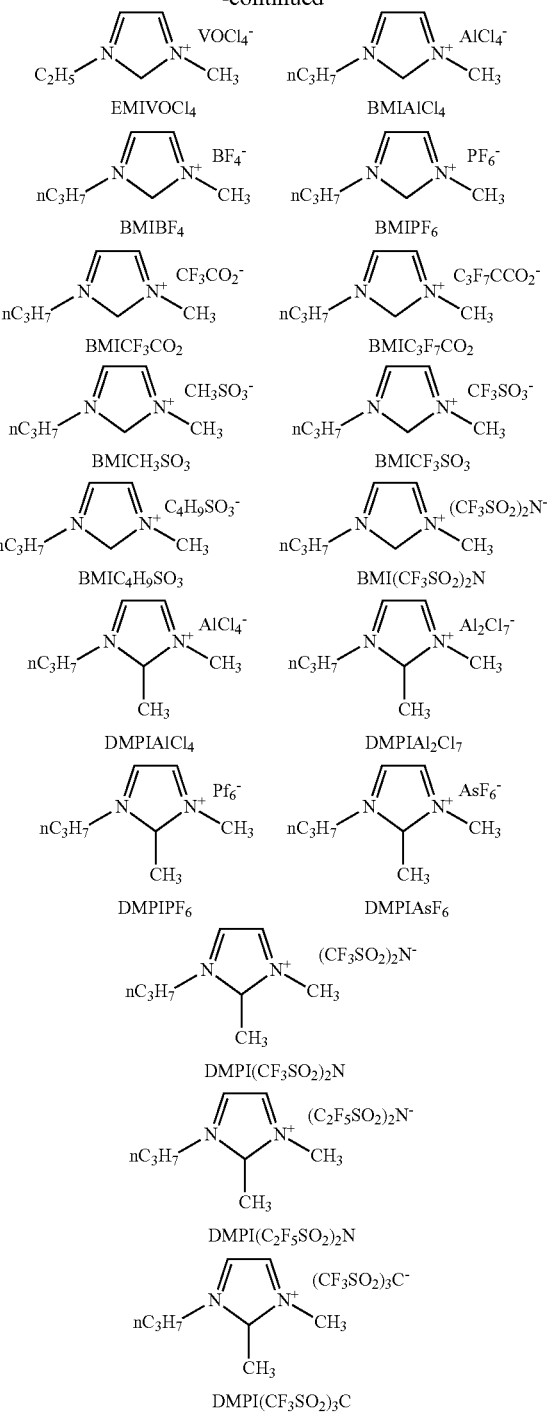

Moreover, since fundamental physical properties of the anion vary significantly according to its kind, the cation and the anion are preferably combined so that the ionic liquid has the physical properties described below.

The ionic liquid has a melting point ranging from −4° C. to −90° C., is liquid at room temperature, is nonvolatile and thus has a vapor pressure of zero, and has a wide liquid temperature region and excellent thermal stability.

The ionic conductivity (s/cm) thereof is $0.1 \times 10^{-3}$ or more at room temperature (25° C.).

The viscosity thereof is 300 cp or less at room temperature (25° C.).

The ionic liquid having the above-mentioned physical properties can contain a chemical species of 1-ethyl-3-methylimidazolium (EMI), 1-butyl-3-methylimidazolium (BMI) or 1,2-dimethyl-3-propylimidazolium (DMPI) noted above.

Although a higher ionic conductivity is more preferable, an upper limit value of the ionic conductivity of a currently available ionic liquid is about $3.5 \times 10^{-3}$. This ionic conductivity evaluation is determined by a complex impedance method using an SUS electrode with an impedance analyzer HP4294A manufactured by TOYO Corporation.

Further, the ionic conductivity (s/cm) is set to be $0.1 \times 10^{-3}$ or more so that the electric charges can be stored more easily at an interface between the above-described dielectric layer and the ionic liquid (colored liquid 21). Because of an increase in an electric charge density, the electric charges repel each other, making it easier to change a surface shape (a surface energy) of the colored liquid 21. Consequently, the ionic liquid can be driven at a low voltage.

Moreover, the ionic liquid is set to have a viscosity of 300 cp or less at 25° C., thereby making it possible to drive the colored liquid 21 at a low voltage that is about 50 V or less. Incidentally, although a lower viscosity is more preferable, a lower limit of the currently available viscosity is about 60 cp.

Moreover, a surface tension of the colored liquid 21 is preferably in a range from 40 mN/m to 75 mN/m. Thereby, the driving characteristics of the colored liquid 21 are prevented from being degraded significantly. For example, various kinds of additives are blended into a pigment ink for ink jet so as to improve a discharging function, and the surface tension thereof is adjusted to be in a range from about 25 mN/m to 40 mN/m. However, the experiments performed by the inventors have proven that, in the case of using it for the display device of the present invention, the driving characteristics thereof are degraded significantly.

Moreover, also in the colored liquid of the second example using the ionic liquid as above, the experiments performed by the inventors have proven that the migration does not occur, similarly to the colored liquid of the first example.

In the display device constituted as above, by a voltage control of turning ON or OFF in the upper switch 35 and the lower switch 37 alternately the colored liquid 21 is moved to the upper space 13 and the lower space 11 alternately via the through hole 15 by the electrowetting phenomenon.

As shown in FIG. 1, when the upper switch 35 is in an ON state and the lower switch 37 is in an OFF state, the colored liquid 21 is present inside the upper space 13. At this time, the display color on the display surface side is a predetermined color resulted from the colored liquid 21.

On the other hand, as shown in FIG. 2, when the upper switch 35 is in the OFF state and the lower switch 37 is in the ON state, the colored liquid 21 in the upper space 13 is moved to the through hole 15 or toward the inside of the lower space 11, thus exposing the light-scattering surface of the light-scattering sheet 10. Consequently, the display color on the display surface side becomes white.

More specifically, when the upper switch 35 is in the ON state and the lower switch 37 is in the OFF state, the wettability of the colored liquid 21 with respect to the surfaces of the water-repellent films 41 and 43 varies in the upper space 13 on the side of the upper electrode 31 supplied with a voltage. As a result, an interfacial tension and a contact angle between the colored liquid 21 and the above-noted surfaces are decreased. Accordingly, the colored liquid 21 is drawn by an external tension, which has increased relatively, is moved from the through hole 15 toward the upper space 13 side and spreads out inside the upper space 13.

On the other hand, when the upper switch 35 is in the OFF state and the lower switch 37 is in the ON state, the electric field is removed from the upper electrode 31. As a result, the external tension with respect to the colored liquid 21 returns to an intrinsic interfacial tension of the colored liquid 21 itself, so that the colored liquid 21 is drawn toward the through hole 15 side and returns from the through hole 15 toward the lower space 11 side. Furthermore, since the lower electrode 32 is turned ON, the colored liquid 21 is sucked from the upper space 13 via the through hole 15 toward the lower space 11 side, so that the colored liquid 21 can be moved at a high speed.

As described above, the display device is constituted as a double electrode structure in which the response speed can be raised by controlling both of the inflow of the colored liquid 21 to the upper space 13 and the outflow of the colored liquid 21 from the upper space 13 by the voltage control of both of the upper electrode 31 and the lower electrode 32.

At the time of moving the colored liquid 21 between the upper space 13 and the lower space 11 by the voltage control of switching between applying and removing the voltage as described above, the nonpolar oil 22 is moved to a position replaced with the colored liquid 21.

In other words, when the colored liquid 21 in the upper space 13 is moved toward the lower space 11 side, the nonpolar oil 22 in the lower space 11 goes up from the inside of the lower space 11 and flows to the side of the upper space 13. Conversely, when the colored liquid 21 in the lower space 11 is moved toward the upper space 13 side, the nonpolar oil 22 in the upper space 13 goes down from the upper space 13 and returns to the side of the lower space 11.

In this manner, by turning ON/OFF the upper switch 35 and the lower switch 37 alternately so as to allow the colored liquid 21 to be present in the upper space 13 while the voltage is applied to the upper electrode 31, a colored display is carried out on the display surface side. On the other hand, when the colored liquid 21 is moved from the upper space 13 via the through hole 15 to the lower space 11, the upper space 13 achieves a white display because the colored liquid 21 is not present any more.

Also, in the display device, as described above, each pixel is partitioned off by the partition walls W1 and W2, so that the driver can move the colored liquid 21 toward the upper space 13 side or the lower space 11 side in each pixel. Consequently, in the display device, individual colors of R, G and B are displayed by allowing the colored liquid 21 colored in its corresponding color to flow into the side of the upper space 13. Further, by allowing all the colored liquids 21 to flow into the corresponding upper spaces 13 in the adjacent pixels of R, G and B, all of the external light can be absorbed, thus achieving a black display on the display surface side.

As described above, in the present embodiment, since the pigment is contained as the coloring agent of the colored liquid 21, the occurrence of the migration is prevented, unlike in the case of using the dye as the coloring agent. As a result, according to the present embodiment, the display color with high sharpness can be displayed, and the display quality on the display surface can be improved. Moreover, because of using the pigment of the self-dispersing type, the dispersion stability of the particles of the pigment in the colored liquid 21 can be improved significantly, so that the driving characteristics of the colored liquid 21 can be stabilized, and thus can be maintained preferably. Thus, the excellent displaying function can be maintained for a long period of time, thereby enhancing the durability.

Alternatively to the above description, the upper electrode 31 may be buried into the upper electrode substrate 14 that is formed of an insulating material. In that case, it becomes possible to omit the dielectric layer on the upper electrode substrate 14.

Further, alternatively to the above description, a communication space that has a rectangular cross-section and a rectangular-parallelepiped shape also may be used instead of the through hole 15.

Embodiment 2

Figure 6:
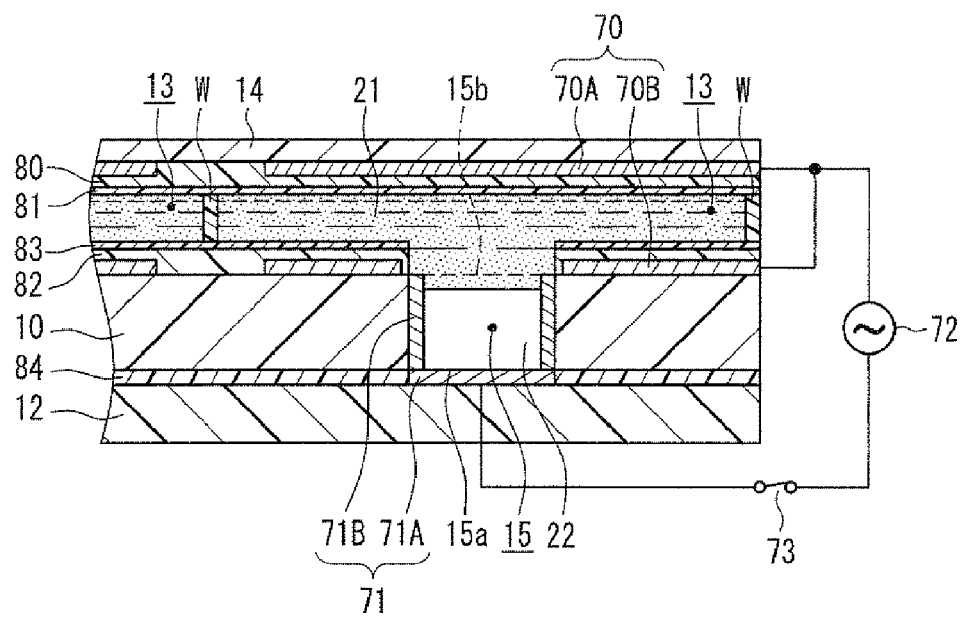
FIG. 6 is a cross-sectional view showing a configuration of a main part of a display device and an image display according to Embodiment 2 of the present invention in a state of displaying a color resulting from a colored liquid.
Figure 7:
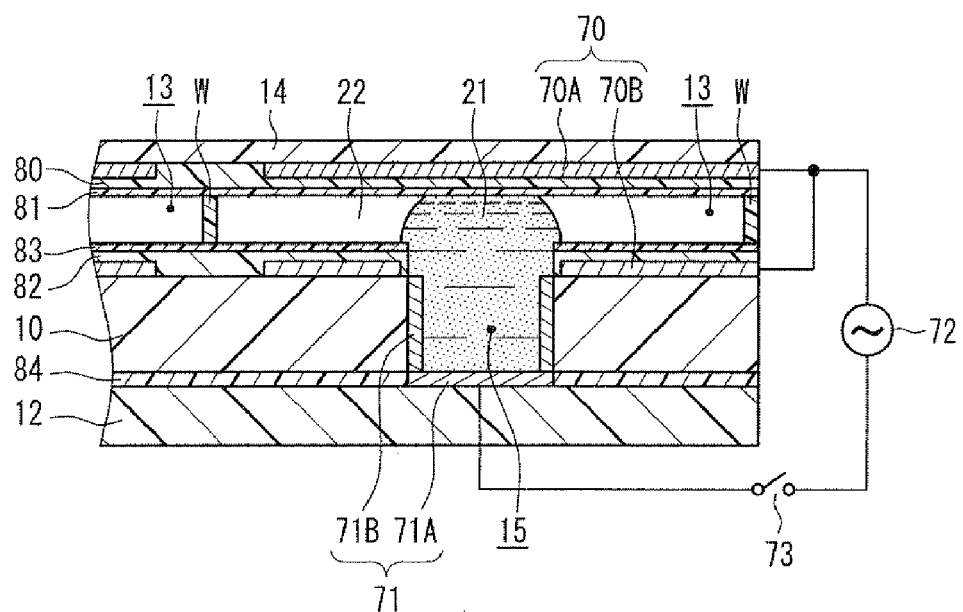
FIG. 7 is a cross-sectional view showing the configuration of the main part of the display device and the image display shown in FIG. 6 in a state of displaying white.

FIG. 6 is a cross-sectional view showing a configuration of a main part of a display device and an image display according to Embodiment 2 of the present invention in a state of displaying a color resulting from a colored liquid. FIG. 7 is a cross-sectional view showing the configuration of the main part of the display device and the image display shown in FIG. 6 in a state of displaying white. In these figures, a main difference between the present embodiment and Embodiment 1 described above lies in the two-terminal structure in which the provision of the above-noted common electrode is omitted. Incidentally, elements provided in common with Embodiment 1 described above are given the same reference numerals, and the redundant description thereof will be omitted here.

As shown in FIGS. 6 and 7, in the present embodiment, the lower electrode substrate 12 is layered via an adhesive layer 48 on a lower surface of the light-scattering sheet 10.

Further, in a central portion of each pixel region of the light-scattering sheet 10, a through hole 15 penetrating the light-scattering sheet 10 in its thickness direction (the vertical direction in the figures) is provided. This through hole 15 constitutes a liquid storage space, and one end thereof is connected with the upper space 13 that constitutes the display space. That is, the lower end opening 15a of the through hole 15 is positioned on a surface of the lower electrode substrate 12, and is closed airtighly by a second electrode 71A, which will be described later. Whereas, the upper end opening 15a is formed such that the through hole 15 is connected with the central portion of the upper space 13, and the through hole 15 and the upper space 13 form a liquid storage portion having a T-shaped cross-section in each pixel. Also, in this liquid storage portion, the colored liquid 21 and the nonpolar oil 22 are sealed similarly to Embodiment 1. In addition, the colored liquids 21 that are colored in different colors are sealed in two adjacent liquid storage portions divided by the partition wall W, so that display colors on the display surface side can be corresponding colors of R, G and B.

Also, in the present embodiment, for the purpose of applying a voltage to or removing a voltage from the colored liquid 21 so as to move the colored liquid 21 and replace it with the nonpolar oil 22, transparent first electrodes 70 are provided on a surface side of the upper space 13 side. More specifically, on a lower surface of the upper electrode substrate 14, an upper-side first electrode 70A is provided so as to cover the display surface side of the upper space 13. Moreover, on the light-scattering sheet 10 side, a lower-side first electrode 70B is provided on surfaces facing the upper space 13 except the opening of the through hole 15. These first electrodes 70A and 70B are transparent electrodes using ITO films or the like, and are connected electrically to each other.

Whereas, in the light-scattering sheet 10 and the lower electrode substrate 12, the second electrode 71 is provided so as to surround the through hole 15. More specifically, on an upper surface of the lower electrode substrate 12, the lower-side second electrode 71A is provided so as to close the lower end opening 15a of the through hole 15. Moreover, in the light-scattering sheet 10, the cylindrical second electrode 71B is provided on the surfaces facing the through hole 15, and these second electrodes 71A and 71B are connected electrically to each other. Further, the second electrode 71A is a transparent electrode using an ITO film or the like. Moreover, the second electrode 71B is an electrode made of a metal such as aluminum or copper, and is formed by a vacuum evaporation method, a sputtering method, an ion plating method, a dip coating method or the like.

Moreover, the first electrode 70 and the second electrode 71 are connected to an alternating-current power supply 72 via a switch 73, and the application of the electric field to the colored liquid 21 is performed and stopped according to the operations of closing/opening the switch 73. Also, the switch 73 and the alternating-current power supply 72 constitute a driver for changing a display color on the display surface side by moving the colored liquid 21 toward the upper space 13 side or the through hole 15 side according to the operations of closing/opening the switch 73, and the colored liquid 21 is moved by the electrowetting phenomenon.

The surfaces of the first electrodes 70A and 70B are provided with dielectric layers 80 and 82, respectively. Also, the surfaces of the dielectric layers 80 and 82 are provided with insulating water-repellent films 81 and 83, respectively, which are in contact with the colored liquid 21 or the nonpolar oil 22.

The dielectric layers 80 and 82 are formed of a high dielectric film containing parylene or aluminum oxide, for example, and have a layer thickness ranging from about 1 μm to 0.1 μm. Also, the water-repellent films 81 and 83 preferably become layers having an affinity for the colored liquid 21 at the time of applying a voltage. More specifically, a fluorocarbon resin is preferable.

Alternatively to the above description, the surface of the second electrode 71 also can be provided with a coating that becomes lipophilic in an ON (closed) state of the switch 73 and becomes lipophobic in an OFF (opened) state of the switch 73, thereby improving a moving speed of the nonpolar oil 22 at the time of the operations of closing/opening the switch 73, so that the moving speed of the colored liquid 21 can be raised as well. However, as shown in FIGS. 6 and 7, it is more preferable that the colored liquid 21 is constantly in contact with a part of the second electrode 71 regardless of the operations of closing/opening the switch 73 so as to apply the voltage to this colored liquid 21 directly, because the moving speed of the colored liquid 21 can be increased easily.

In the present embodiment constituted as described above, when the switch 73 is turned ON, the wettability of the colored liquid 21 with respect to the surfaces of the water-repellent films 81 and 83 on the upper space 13 side of the first electrode 70 supplied with a voltage varies, thus decreasing an interfacial tension and a contact angle between the colored liquid 21 and the above-noted surfaces. Accordingly: the colored liquid 21 is drawn by an external tension, which has increased relatively, is moved from the through hole 15 side toward the upper space 13 side and spreads out inside the upper space 13.

On the other hand, when the switch 73 is turned OFF, the voltage is removed from the first electrode 70. Then, the external tension with respect to the colored liquid 21 returns to an intrinsic interfacial tension of the colored liquid 21 itself so that the colored liquid 21 is drawn toward the through holes 15 side and returns to the insides of the through holes 15.

At the time of moving the colored liquid 21 between the upper space 13 and the through hole 15 by the voltage control of switching between applying and removing the voltage as described above, the nonpolar oil 22 is moved to a position replaced with the colored liquid 21.

In other words, when the colored liquid 21 in the upper space 13 is moved toward the through hole 15 side, the nonpolar oil 22 in the through hole 15 goes up from the inside of the through hole 15 and flows in toward the upper space 13 side. Conversely, when the colored liquid 21 in the through hole 15 moves toward the upper space 13 side, the nonpolar oil 22 in the upper space 13 goes down from the upper space 13 and returns to the through hole 15 side.

In this manner, by turning ON the switch 73 so as to allow the colored liquid 21 to be present in the upper space 13 while the voltage is applied to the first electrode 70, a color resulting from the colored liquid 21 can be displayed on the display surface side. On the other hand, by turning OFF the switch 73 so as to allow the colored liquid 21 to return from the upper space 13 to the through hole 15 side while the voltage is not applied to the first electrode 70, the colored liquid 21 is replaced with the transparent nonpolar oil 22 inside the upper space 13. Thus, the upper surface (light-scattering surface) of the light-scattering sheet 10 is exposed to the display surface side, thereby displaying white.

Moreover, as described above, the display device is partitioned off by the partition wall W for each pixel, and the above-described driver can move the colored liquid 21 toward the upper space 13 side or the through hole 15 side in each pixel. Accordingly, in the display device, each of the colors of R, G and B is displayed by allowing the colored liquid 21 that is colored in the corresponding color to flow into the upper space 13 side. Further, in the respective adjacent pixels of R, G and B, all of the colored liquids 21 flow into the corresponding upper spaces 13 so as to absorb all of external light, so that the display surface side can display black.

In the present embodiment, according to the above-described configuration, the colored liquid 21 that contains the pigment of the self-dispersing type is used, thereby producing effects similar to those in Embodiment 1. Moreover, in the present embodiment, the configuration of the display device can be more simple than that of Embodiment 1, so that the compact display device can be constituted more easily.

Alternatively to the above description, the first electrode 70 may be buried into the upper electrode substrate 14 that is formed of an insulating material, for example. In that case, it becomes possible to omit the dielectric layer on the upper electrode substrate 14.

Further, alternatively to the above description, a liquid storage space that has a rectangular cross-section and a rectangular-parallelepiped shape also may be used instead of the through hole 15. Also, the liquid storage space can be constituted of the two or more through holes.

Embodiment 3

Figure 8:
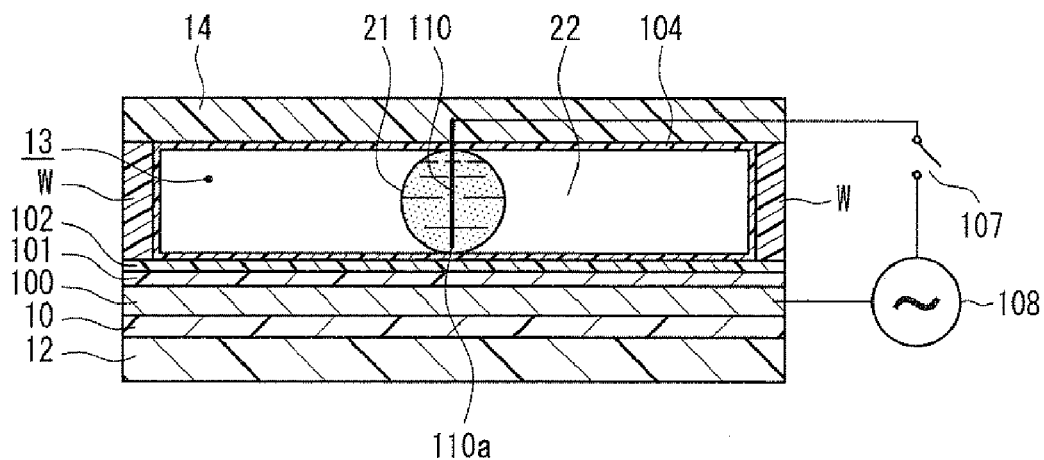
FIG. 8 is a cross-sectional view showing a configuration of a main part of a display device and an image display according to Embodiment 3 of the present invention in a state of displaying white.
Figure 9:
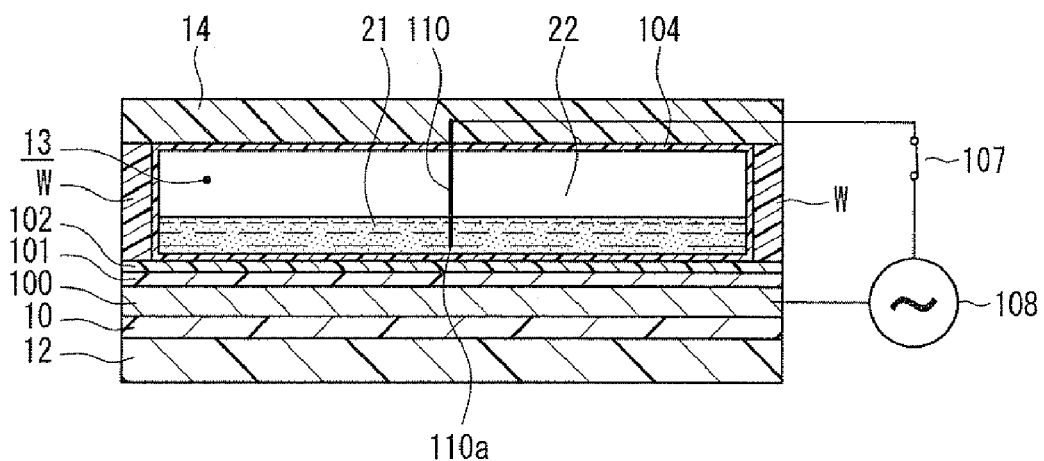
FIG. 9 is a cross-sectional view showing the configuration of the main part of the display device and the image display shown in FIG. 8 in a state of displaying a color resulting from a colored liquid.

FIG. 8 is a cross-sectional view showing a configuration of a main part of a display device and an image display according to Embodiment 3 of the present invention in a state of displaying white. FIG. 9 is a cross-sectional view showing the configuration of the main part of the display device and the image display shown in FIG. 8 in a state of displaying a color resulting from a colored liquid. In these figures, a main difference between the present embodiment and Embodiment 2 described above lies in that a planar electrode and a needle electrode are provided instead of the first electrode and the second electrode described above. Incidentally, elements provided in common with Embodiment 2 described above are given the same reference numerals, and the redundant description thereof will be omitted here.

That is, as shown in FIGS. 8 and 9, in the present embodiment, the transparent upper electrode substrate 14, and the lower electrode substrate 12 that is disposed on a lower side of the display space 13 with a rectangular-parallelepiped shape in which each pixel is partitioned off by the partition walls W with respect to the upper electrode substrate 14 are provided. On an upper surface of the lower electrode substrate 12, the light-scattering sheet 10 is layered so as to be formed into one piece.

Inside of the display space 13, the colored liquid 21 and the nonpolar oil 22 are filled in a state of being sealed.

On an upper surface of the light-scattering sheet 10, a transparent planar electrode 100 made of an ITO film is provided. On an upper surface of the planar electrode 100, a transparent dielectric layer 101 and a water-repellent film 102 are layered in this order. Moreover, a water-repellent film 104 is disposed so as to surround the display space 13. In a central position of a length direction of the display space 13, a needle electrode 110 droops from the upper electrode substrate 14 into the display space 13, and a tip 10a of the needle electrode 110 is positioned so as to have a gap from the water-repellent film 104 on a side of a lower surface of the display space 13. That is, at the central portion of the display space 13, the hydrophilic needle electrode 110 is extended in the vertical direction.

To the planar electrode 100 and the needle electrode 110, a power supply 108 is connected via a switch 107, and a voltage is applied between the planar electrode 100 and the needle electrode 110 while the switch 107 is in an ON state. Moreover, the switch 107 and the power supply 108 constitute a diver that increases and decreases a surface area of the colored liquid 21 inside the display space 13 according to the operations of closing/opening the switch 107 so as to change the display color on the display surface side.

According to the present embodiment structured as described above, as shown in FIG. 8, when the switch 107 between the planar electrode 100 and the needle electrode 110 is in an OFF state, the colored liquid 21 is adhered only to around the needle electrode 110 so as to have a spherical shape, the transparent nonpolar oil 22 spreads out along the planar electrode 100 on a lower side of the display space 13. In this state, due to the diffusion from the light-scattering sheet 10, white display is achieved on the display surface side.

Whereas, as shown in FIG. 9, when the switch 107 is turned ON, the colored liquid 21 that is held around the needle electrode 110 is moved to the planar electrode 100 side, and spreads along the planar electrode 100 into the display space 13, thereby changing into the color display resulted from the colored liquid 21.

It should be noted that, when the switch 107 is in the ON state (FIG. 9), the surface area of the colored liquid 21 in the display space 13 can be about twenty times as large as that of the case where the switch 107 is in the OFF state (FIG. 8).

In the present embodiment, according to the above-described configuration, the colored liquid 21 that contains the pigment of the self-dispersing type is used, thereby producing effects similar to those in Embodiment 2. Moreover, in the present embodiment, the more compact display device with the simple configuration can be constituted, compared with that of Embodiment 2, so that the changing speed of the display color can be increased easily.

Alternatively to the above description, it may adopt a configuration in which the transparent planar electrode is provided on the upper electrode substrate 14 side, and the needle electrode protrudes from the light-scattering sheet 10 side into the display space 13.

It should be noted that the above-described embodiments are all illustrative and not limiting. The technical scope of the present invention is defined by the claims, and all changes within the range equivalent to the configurations recited therein also are included in the technical scope of the present invention.

For example, although the above description has been directed to the case of applying the present invention to an image display including a display portion that can display a color image, the present invention can be used in any electronic apparatuses provided with a display portion for displaying information containing a character and an image without any particular limitation. The present invention can be used in a preferred manner in various electronic apparatuses including a display portion, for example, personal digital assistants (PDAs) such as electronic personal organizers, displays attached to personal computers and TV sets, and electronic papers.

Although the above description has been directed to the case of constituting a display device of an electrowetting system in which the colored liquid was moved or increased/decreased the surface area thereof according to the application of an electric field to this colored liquid, the display device of the present invention is not limited to this as long as it is a display device of an electric field induction type in which a colored liquid containing a conductive liquid as the dispersion medium and a pigment of a self-dispersing type as a coloring agent are used, and an external electric field is utilized to operate the colored liquid inside a display space, thereby making it possible to change a display color on the display surface side. The present invention is applicable to electric-field-induction-type display devices of other systems such as an electroosmosis system, an electrophoresis system and the like.

However, as the above respective embodiment, the case of including a transparent upper layer provided on the display surface side and a light-scattering layer provided such that the display space is formed between the upper layer and the light-scattering layer and selectively changing the display color on the display surface side between a predetermined color resulting from a colored liquid and white resulting from the light-scattering layer is more preferable because the configuration of the display device can be simplified, and further because the display quality of white display can be improved easily by displaying white resulting from the light-scattering layer.

Moreover, the above description has been directed to the case of using the ionic liquid as the conductive liquid, but the conductive liquid of the present invention is not limited to this, and for example, alcohol, acetone, formamide, ethyleneglycol, water or a mixture thereof may also be used as the conductive liquid.

Moreover, the above description has been directed to the case of using the nonpolar oil, but the present invention is not limited to this, and an insulating fluid that is not blended in the conductive liquid may be used, for example, the air may be used instead of the nonpolar oil.

Alternatively to the above-described description, the nonpolar oil may be converted into a light-scattering fluid by blending light-scattering molecules into the nonpolar oil, for example. In the case of constituting like this, a transparent lower layer made of the same material as that of the above-described upper layer can be obtained, instead of the above-described light-scattering layer.

Also, although the above description has been directed to the case of constituting the display surface including display spaces for individual colors of R, G and B, the present invention is not limited to this as long as a plurality of display spaces are provided respectively for a plurality of primary colors allowing a full color display on the display surface side. More specifically, display spaces in which colored liquids colored respectively in cyan (C), magenta (M) and yellow (Y) are sealed are provided instead of the display spaces for R, G and B described above, thus constituting the display spaces for individual colors of C, M and Y. However, in the case of constituting the display spaces for C, M and Y, it is more preferable to provide a display space for black having a colored liquid colored in black, because the display quality of black display may deteriorate compared with the case of R, G and B. Furthermore, it also is possible to use colored liquids colored in predetermined colors corresponding to combinations of a plurality of primary colors that can display a color image on the display surface other than R, G, B and C, M, Y, for example, R, G, B, Y, C (five colors), R, G, B, C (four colors), R, G, B, Y (four colors), G, M (two colors), etc.

Moreover, the above description has been directed to the case of using the alternating-current power supply, but instead of the alternating-current power supply, a direct-current power supply can be used to be included in the driver.

INDUSTRIAL APPLICABILITY

Since the display device of the present invention and the electric apparatus using the same improve display quality and have high durability that enables to maintain an excellent displaying function over a long period of time, the present invention is effective to a display device that can display a moving image and an electric apparatus using the same.

The invention claimed is:
1. A display device comprising:
a display space provided on a display surface side; and a colored liquid that is sealed inside the display space so as to be operable and is colored in a predetermined color, and the display device structured so as to be able to change a display color on the display surface side according to application of an electric field to the colored liquid,
wherein the colored liquid comprises a conductive liquid as a dispersion medium and a pigment of a self-dispersing type as a coloring agent, and
wherein a surface tension of the colored liquid ranges from 40 mN/m to 75 mN/m.
2. The display device according to claim 1, further comprising: a transparent upper layer provided on the display surface side; and a light-scattering layer provided such that the display space is formed between the upper layer and the light-scattering layer,
wherein the display color on the display surface side is changed selectively between a predetermined color resulted from the colored liquid and white resulted from the light-scattering layer.
3. The display device according to claim 2, comprising a lower layer provided on a non-display surface side of the light-scattering layer,
wherein an upper space constituting the display space is formed between the upper layer and the light-scattering layer, and a lower space that is connected with the upper space via a communication space provided so as to penetrate the light-scattering layer is provided between the light-scattering layer and the lower layer, and
the display device comprises
a transparent upper electrode provided on a surface side of the upper space side in at least one of the upper layer and the light-scattering layer, a common electrode provided in the light-scattering layer so as to surround the communication space, a lower electrode provided on a surface side of the lower space side in at least one of the light-scattering layer and the lower layer, and a driver that comprises an upper switch connected between the upper electrode and the common electrode, a lower switch connected between the lower electrode and the common electrode and a power supply, and changes the display color on the display surface side by moving the colored liquid toward the upper space side or the lower space side according to operations each of closing/opening the upper switch and the lower switch.

4. The display device according to claim 2, wherein the light-scattering layer is provided with a liquid storage space whose one end is connected with the display space, and the display device comprises a transparent first electrode provided on a surface side of the display space side in at least one of the upper layer and the light-scattering layer, a second electrode provided in the light-scattering layer so as to surround the liquid storage space, and a driver that has a switch and a power supply connected between the first electrode and the second electrode, and changes the display color on the display surface side by moving the colored liquid toward the display space side or the liquid storage space side according to operations of closing/opening the switch.

5. The display device according to claim 2 comprising:

a transparent planer electrode provided on a surface side of the display space side in one of the upper layer and the light-scattering layer;

a needle electrode that protrudes from the other of the upper layer and the light-scattering layer into the display space; and a driver that has a switch and a power supply connected between the planar electrode and the needle electrode, and changes the display color on the display surface side by increasing/decreasing a surface area of the colored liquid inside the display space according to operations of closing/opening the switch.

6. The display device according to claim 1, wherein an insulating fluid that is not blended in the colored liquid is sealed inside the display space.

7. The display device according to claim 1, wherein the pigment is of a self-dispersing type in which a functional group for increasing an affinity for the conductive liquid is bonded to a surface of a particle of the pigment directly or via other atomic group.

8. The display device according to claim 1, wherein the pigment has the surface of the particle that is subjected to modification treatment, and contains at least one kind selected from the group consisting of a carboxyl group, a hydroxyl group, a carbonyl group, a sulfone group, a hydroxyl group and a phosphate group, and is a self-dispersing type having a functional group for increasing the affinity for the conductive liquid.

9. The display device according to claim 1, wherein electrification of the particle of the pigment is +20 mV or more, or −20 mV or less in zeta potential value.

10. The display device according to claim 1, wherein a volume average particle diameter of the particles of the pigment is 5 μm or less.

11. The display device according to claim 1, wherein a coefficient of a variation of a volume particle size distribution of the particles of the pigment is 50 or less.

12. The display device according to claim 1, wherein a content of the pigment in the colored liquid is 50 wt % or less with respect to a total weight % of the colored liquid.

13. The display device according to claim 1, wherein the conductive liquid is an ionic liquid containing an ambient temperature molten salt obtained by combining a cation and an anion.

14. The display device according to claim 13, wherein a melting point of the ionic liquid ranges from −4° C. to −90° C.

15. The display device according to claim 13, wherein an electrolyte of the ionic liquid is formed of a 1-1 salt obtained by combining one kind of the cation that is monovalent and one kind of the anion that is monovalent.

16. The display device according to claim 13 wherein the cation is selected from the group consisting of 1,3-dialkylimidazolium cation, N-alkylpyridinium cation, tetraalkylammonium cation and tetraalkylphosphonium cation.

17. The display device according to claim 13, wherein the anion is selected from the group consisting of $(AlCl_3)nCl^-$, $(AlBr_3)nBr^-$, $Cl^-$, $Br^-$, $I^-$, $(HF)nF^-$, $(HF)_2F_3^-$, $BF_4^-$, $AlF_4^-$, $PF_6^-$, $AsF_6^-$, $SbF_6^-$, $NbF_6^-$, $TaF_6^-$, $CH_3SO_3^-$, $WF_7^-$, $NO_3^-$, $NO_2^-$, $VOCl_4^-$, $CF_3SO_3^-$, $(CF_3SO_2)_2N^-$, $(CF_3SO_2)_3C^-$, $C_4H_9SO_3^-$, $(CF_3CF_2SO_2)N^-$, $CF_3CO_2^-$, $CF_3CF_2CF_2CO^-$, $CF_3CF_2CF_2SO_3^-$, $(CN)_2N^-$ and $CH_3CO_2^-$, where n is an integer.

18. The display device according to claim 1, wherein a plurality of the display spaces are provided respectively for a plurality of primary colors that enable a full color display on the display surface side.

19. An electronic apparatus comprising a display portion for displaying information containing a character and an image, wherein the display device according to claim 1, is used for the display portion.

20. A display device comprising:

a display space provided on a display surface side; and a colored liquid that is sealed inside the display space so as to be operable and is colored in a predetermined color, and the display device structured so as to be able to change a display color on the display surface side according to application of an electric field to the colored liquid, wherein the colored liquid comprises a conductive liquid as a dispersion medium and a pigment of a self-dispersing type as a coloring agent, and wherein an ionic conductivity (s/cm) of the conductive liquid at 25° C. is $0.1 \times 10^{-3}$ or more.

21. A display device comprising:

a display space provided on a display surface side; and a colored liquid that is sealed inside the display space so as to be operable and is colored in a predetermined color, and the display device structured so as to be able to change a display color on the display surface side according to application of an electric field to the colored liquid, wherein the colored liquid comprises a conductive liquid as a dispersion medium and a pigment of a self-dispersing type as a coloring agent, and wherein a viscosity of the colored liquid at 25° C. is 300 cp or less, and a surface tension of the colored liquid ranges from 40 mN/m to 75 mN/m.

* * * * *